United States Patent [19]

Shimamura et al.

[11] Patent Number: 5,354,637
[45] Date of Patent: Oct. 11, 1994

[54] MAGNETIC TONER

[75] Inventors: Masayoshi Shimamura, Kawasaki; Toshiaki Nakahara, Tokyo; Kuniko Kobayashi, Koganei; Kazuyoshi Hagiwara, Tokyo; Yushi Mikuriya, Kawasaki; Masami Fujimoto, Yokohama, all of Japan

[73] Assignee: Canon Kabushiki Kaisha, Tokyo, Japan

[21] Appl. No.: 897,849

[22] Filed: Jun. 12, 1992

[30]  Foreign Application Priority Data

Jun. 19, 1991 [JP] Japan .................. 3-147403

[51] Int. Cl.$^5$ .............................................. G03G 9/083
[52] U.S. Cl. ........................... 430/106.6; 430/109; 430/110; 430/111; 430/903; 430/137
[58] Field of Search ............ 430/106.6, 109, 110, 430/111, 903, 137

[56]  References Cited

U.S. PATENT DOCUMENTS

| | | | |
|---|---|---|---|
| 2,221,776 | 11/1940 | Carlson | 95/5 |
| 2,618,552 | 11/1952 | Wise | 95/1.9 |
| 2,874,063 | 2/1959 | Greig | 117/17.5 |
| 3,909,258 | 9/1975 | Kotz | 96/112 |
| 4,297,395 | 10/1981 | Buxbaum et al. | 427/127 |
| 4,395,476 | 7/1983 | Kanbe et al. | 430/102 |
| 4,820,603 | 4/1989 | Sakashita | 430/106.6 |
| 4,946,755 | 8/1990 | Inoue | 430/106.6 |
| 5,296,326 | 3/1994 | Taya et al. | 430/106.6 |

FOREIGN PATENT DOCUMENTS

| | | | |
|---|---|---|---|
| 401000 | 12/1990 | European Pat. Off. | |
| 53-35697 | 4/1978 | Japan | C01G 49/02 |
| 58-18656 | 2/1980 | Japan | G03G 13/08 |
| 58-18964 | 2/1983 | Japan | H01L 29/72 |
| 61-34070 | 2/1986 | Japan | C09C 1/24 |
| 62-279352 | 12/1987 | Japan | G03G 9/08 |

OTHER PUBLICATIONS

Abstract of JPA 58-2226, Sect. C, No. 157, vol. 7, No. 66, P.G. 146 Mar. 18, 1983).

*Primary Examiner*—Marion E. McCamish
*Assistant Examiner*—Rosemary Ashton
*Attorney, Agent, or Firm*—Harper, FitzPatrick, Cella & Scinto

[57] ABSTRACT

A magnetic toner is constituted by at least a binder resin and a magnetic iron oxide. The magnetic iron oxide is characterized by having an Fe(II) content of 18.5–24.1 wt. %, and shows a BET specific surface area of S (m$^2$/g) and an X-ray diffraction pattern giving a half-value width W (deg.) of a diffraction peak corresponding to 311 plane of the magnetic iron oxide in spinel structure, the values S and W satisfying: $4.5 \times 10^{-3}S + 0.130 \leq W \leq 4.5 \times 10^{-3}S + 0.160$, and $4.5 \leq S \leq 11.0$. Alternatively, the magnetic iron oxide is characterized by having a number-average particle size D satisfying a relationship with W of: $-0.08D + 0.180 \leq W \leq -0.08D + 0.212$, and $0.10 \leq D \leq 0.45$. The relationship between W and S or D indicates a good crystallinity of the magnetic iron oxide which provides the magnetic toner with a stable performance for a long period of time. The magnetic iron oxide can be obtained through a heating treatment at a temperature of 130°–360° C. within a gaseous mixture of hydrogen and nitrogen containing 50 vol. % or less of hydrogen or at a temperature of 150°–450° C. in an inert gas.

20 Claims, 5 Drawing Sheets

MAGNETIC TONER

FIELD OF THE INVENTION AND RELATED ART

The present invention relates to a magnetic toner for use in image forming methods, such as electrophotography, electrostatic recording, and magnetic recording.

Various developing methods for visualizing electrostatic latent images with toner have been known. For example, there have been known the magnetic brush method as disclosed in U.S. Pat. No. 2,874,063; the cascade developing method as disclosed in U.S. Pat. No. 2,618,552; the powder cloud method as disclosed in U.S. Pat. No. 2,221,776; in addition, the fur brush developing method; and the liquid developing method. Among these developing methods, those developing methods using a developer composed mainly of a toner and a carrier such as the magnetic brush method, the cascade process and the liquid developing method have been widely used commercially. While these methods provide good images relatively stably, they involve common problems accompanying the use of two-component developers, such as deterioration of carriers and change in mixing ratio of the toner and carrier.

In order to obviate such problems, various developing methods using a one-component developer consisting only of a toner, have been proposed. Among these, there are many excellent developing methods using developers comprising magnetic toner particles.

U.S. Pat. No. 3,909,258 has proposed a developing method using an electroconductive magnetic toner, wherein an electroconductive magnetic toner is carried on a cylindrical electroconductive sleeve provided with a magnet inside thereof and is caused to contact an electrostatic image to effect development. In this method, as the development zone, an electroconductive path is formed with toner particles between the recording member surface and the sleeve surface and the toner particles are attached to image portions due to a Coulomb's force exerted from the image portions to effect development. This method using an electroconductive magnetic toner is an excellent method which has obviated the problems involved in the two-component developing methods. However, as the toner is electroconductive, there is involved a problem that it is difficult to transfer the developed image electrostatically from the recording member to a final support member such as plain paper.

As a developing method using a magnetic toner with a high resistivity which can be electrostatically transferred, a developing method using a dielectric polarization of toner particles is known. Such a method, however, involves essential problems that the developing speed is slow and a sufficient density of developed image cannot be obtained.

As another method using a high resistivity magnetic toner, there are known methods wherein toner particles are triboelectrically charged through friction between toner particles or friction between a friction member such as a sleeve and toner particles, and then caused to contact an electrostatic image-bearing member to effect development. However, these methods involve problems that the triboelectric charge is liable to be insufficient because the number of friction between the toner particles and the friction member, and the charged toner particles are liable to agglomerate on the sleeve because of an enhanced Coulomb's force.

A developing method having eliminated the above described problems has been proposed in U.S. Pat. No. 4,395,476 (corresponding to Japanese Laid-Open Patent Application (KOKAI) No. 18656/1980). In this method (so-called "jumping developing method"), a magnetic toner is applied in a very small thickness on a sleeve, triboelectrically charged and is brought to an extreme vicinity to an electrostatic image to effect development. More specifically, in this method, an excellent image is obtained through such factors that a sufficient triboelectric charge can be obtained because a magnetic toner is applied onto a sleeve in a very small thickness to increase the opportunity of contact between the sleeve and the toner; the toner is carried by a magnetic force, and the magnet and the toner are relatively moved to disintegrate the agglomerate of the toner and cause sufficient friction between the toner and the sleeve; and the toner layer is caused to face an electrostatic image under a magnetic field and without contact to effect development.

In the jumping developing method known heretofore as described above, some difficulties can be encountered in some cases on continuation of repetitive copying, such as a decrease in uniformity of a developer layer carried on a developer-carrying member, occurrence of streak coating irregularities in a circumferential direction of the developer-carrying member and remarkable local thickening of the carried developer layer compared with that at the initial stage, resulting in spots irregularities or wave-like irregularities. The former results in white streaks and the latter results in spots or wave-like density irregularities respectively in developed images. These difficulties seldom occur in ordinary repetitive copying but can occur in some cases during continuous use for a long period in an extremely low temperature-low humidity environment. In such cases, a lowering in image density is liable to occur. Also in a high temperature-high humidity environment, the developer layer thickness is liable to be thinner, to result in a decrease in image density in some cases. It has been found that the above difficulties are caused by changes in attachment of developer powder onto the sleeve and transfer of developer powder from the sleeve.

More specifically, the above difficulties are caused by a change in environmental conditions resulting in portions of ununiform triboelectric charge in the developer layer carried on the developer-carrying member. Thus, under extremely low temperature-low humidity conditions, a portion of the developer can have an extremely large triboelectric charge due to friction between the developer-carrying member surface and the developer and, due to an image force caused by the charge, such a portion having an extremely large triboelectric charge is liable to be accumulated in the vicinity of the developer-carrying member. The accumulated portion having an extremely large triboelectric charge affects the uniformity of coating or developing performance of the developer forming an upper layer, thus resulting in the above-mentioned difficulties such as white streaks, spot irregularities and wave-like coating irregularities.

The decrease in developer layer thickness under high temperature-high humidity conditions is caused by an un-uniformity of triboelectrification between the developer and the developer-carrying member and thus unstability of triboelectric charge of the developer in the vicinity of the developer-carrying member surface.

Un-uniformity of triboelectric charge of the developer leads to ground fog as a serious image defect. In recent years, a variety of functions are required of a copying machine including superposing multi-color copying where a part of an image is erased by exposure, etc., followed by insertion of another image thereat, and framing where a marginal portion of transfer paper is erased into white. In such cases, occurrence of ground fog at parts of images to be erased in white causes a serious problem.

More specifically, when a potential of a polarity opposite to that of a latent image potential is provided by irradiation with intense light from an LED or a fuse lamp to erase an image, an increased tendency of ground fog at such parts is observed. Further, in case of multi-color superposition copying, mixing of colors can occur to impair the clarity of images.

The above-mentioned unstability of a developer layer carried on a developer-carrying member is liable to occur with respect to a developer which has been left standing for a long period in a high temperature—high humidity environment to have a chargeability different from that in the initial stage. Accordingly, it has been necessary to strictly control the storage condition of developers.

Several proposals have been made regarding improvement of magnetic iron oxide used in magnetic toners.

For example, with respect to production of magnetic iron oxide through an aqueous solution reaction, various proposals have been made in respects of kinds of an alkali used for neutralization and the pH of a solution containing ferrous hydroxide after the neutralization. However, the thus produced magnetic iron oxide particles still leave a room for improvement in environmental characteristics.

As a method for improving magnetic iron oxide, addition of a constituent of an inverse-spinel ferrite represented by a divalent metal is known. In addition thereto, there is also known a method of adding silicic acid, aluminum, phosphoric acid, etc., as proposed by Japanese Patent Laid-Open Application (JP-A) 58-2226. Silicic acid as an additive has been known to show an effect of improving heat resistance by coating the particle surfaces (e.g., JP-A 53-35697). However, such coated silicic acid still leaves a room for improvement regarding the stability of triboelectric charge when used in a magnetic toner.

JP-A 58-18964 discloses a magnetic toner using a magnetic iron oxide having a specified FeO content of 16-25 wt. %. According to our study, the toner tends to show a smaller change in triboelectric charge under different environmental conditions but has left a room for further improvement.

The JP-A reference discloses, as a comparative example, a magnetic iron oxide having an FeO content of 26 wt. % or above prepared by reducing magnetic iron oxide at 400° C. in a hydrogen stream. According to our study, the magnetic iron oxide contained magnetite in an inferior crystalline state and was easily oxidized, thus providing a magnetic toner which caused a remarkable change in triboelectric chargeability as disclosed in the JP-A reference.

JP-A 61-34070 discloses a process for preparing magnetite wherein a silicic acid compound is added to ferrous hydroxide, when a reaction to magnetite has proceeded, to obtain magnetite particles; the magnetite particles are oxidized under heating into $\alpha$-$Fe_2O_3$ particles; and the $\alpha$-$Fe_2O_3$ particles are reduced under heating at 300°-500° C. in a reducing atmosphere to obtain magnetite. The magnetite particles obtained by the process still show inferior crystallinity and are liable to sinter with each other, thus being insufficient to provide a magnetic toner showing a stable triboelectric chargeability.

U.S. Pat. No. 4,820,603 (corr. to JP-A 62-279352) discloses a magnetic toner comprising a magnetic iron oxide containing silicon element. In the magnetic iron oxide, the silicon element is forced to be present at the core of the magnetic iron oxide particles, but the resultant magnetic toner containing the magnetic iron oxide has left a room for improvement in respect of the environmental stability.

SUMMARY OF THE INVENTION

A generic object of the present invention is to provide a magnetic toner having solved the above-mentioned objects.

A more specific object of the present invention is to provide a magnetic toner causing no or suppressed change in image density over a long period of time under various environmental conditions.

Another object of the present invention is to provide a magnetic toner capable of suppressing a so-called charge-up phenomenon that excessive charge is accumulated on toner particles for a long period of time, and also suppressing occurrence of toner coating failure and density decrease for a long period of time.

A further object of the present invention is to provide a magnetic toner capable of providing clear images having a high image density and having no or only suppressed degree of fog.

According to the present invention, there is provided a magnetic toner, comprising: at least a binder resin and a magnetic iron oxide; wherein said magnetic iron oxide has an Fe (II) content of 18.5-24.1 wt. %, and shows a BET specific surface area of S ($m^2/g$) and an X-ray diffraction pattern giving a half-value width W (deg.) of a diffraction peak corresponding to 311 plane of the magnetic iron oxide in spinel structure, the values S and W satisfying:

$4.5 \times 10^{-3}S + 0.130 \leq W \leq 4.5 \times 10^{-3}S + 0.160$, and
$4.5 \leq S \leq 11.0$.

According to another aspect of the present invention, there is provided a magnetic toner, comprising: at least a binder resin and a magnetic iron oxide; wherein said magnetic iron oxide has been obtained through a heating treatment at a temperature of 130°-360° C. within a gaseous mixture of hydrogen and nitrogen containing 50 vol. % or less of hydrogen or at a temperature of 150°-450° C. in an inert gas, and said magnetic iron oxide has an Fe(II) content of 18.5-24.1 wt. %, and shows a number-average particle size of D ($\mu$m) and an X-ray diffraction pattern giving a half-value width W (deg.) of a diffraction peak corresponding to 311 plane of the magnetic iron oxide in spinel structure, the values D and W satisfying:

$-0.08D + 0.180 \leq W \leq -0.08D + 0.212$, and
$0.10 \leq D \leq 0.45$.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
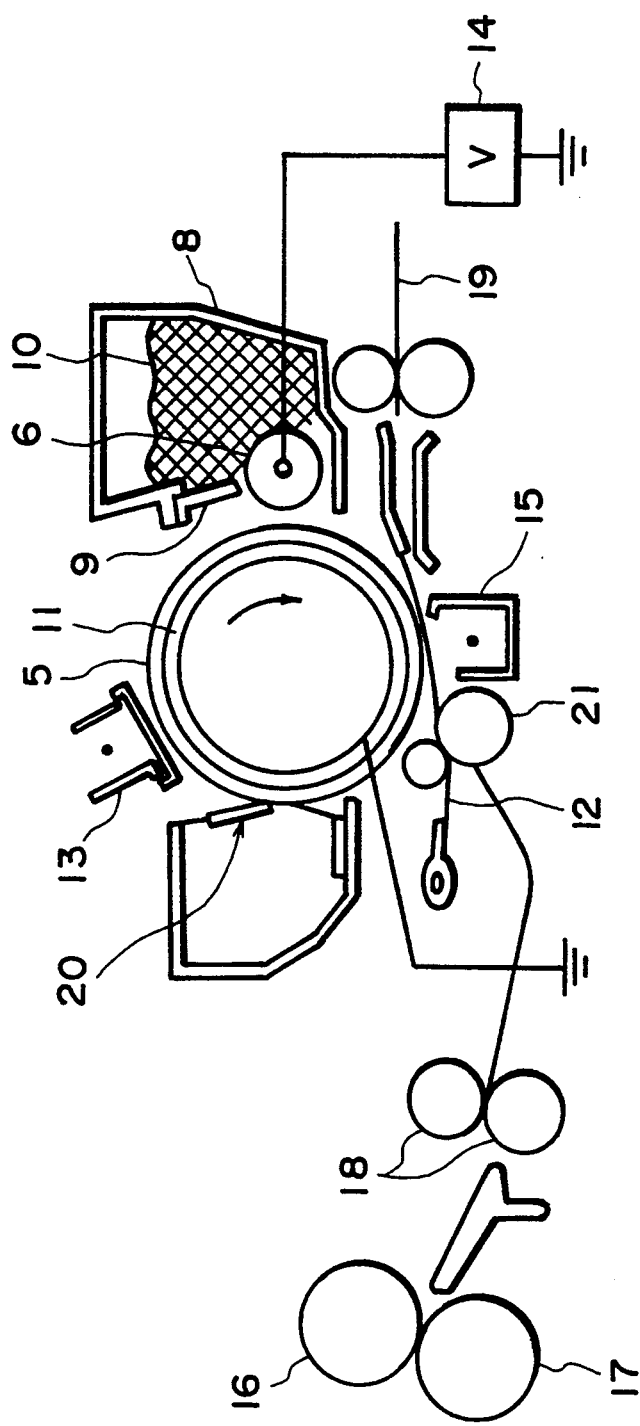
FIG. 1 is an illustration of an image forming apparatus to which the magnetic toner according to the present invention is applicable.

As a result of our study for solving the above-mentioned problems, it has been found that one of the principal causes of the above-mentioned problems is given by the magnetic material contained in magnetic toners and, as a result of further study, we have succeeded in providing a magnetic iron oxide capable of being uniformly dispersed in a toner binder resin to provide a magnetic toner which can be stably and moderately charged and show excellent environmental characteristics.

More specifically, we have found it important to control the crystallinity of magnetic iron oxide as well as Fe (II) content in the magnetic iron oxide in order to provide a toner showing a stable triboelectric chargeability for a long period under various environmental conditions.

While it has not been fully clarified theoretically, we assume that a magnetic iron oxide having a crystallinity accompanied with few defects is not readily oxidized even if the magnetic iron oxide has a large Fe (II) content and, as a result, the magnetic toner can retain a good balance between the charge accumulation due to repetitive friction of the magnetic toner and the charge relaxation peculiar to Fe (II) at microscopic boundaries at the magnetic toner surfaces effectively and stably for a long period of time.

The magnetic iron oxide used in the magnetic toner according to the present invention is characterized by having an Fe (II) content of 18.5–24.1 wt. %, and showing a BET specific surface area of S ($m^2/g$) and an X-ray diffraction pattern giving a half-value width W (deg.) of a diffraction peak corresponding to 311 plane of the magnetic iron oxide in spinel structure, the values S and W satisfying:

$4.5 \times 10^{-3}S + 0.130 \leq W \leq 4.5 \times 10^{-3}S + 0.160$, and
$4.5 \leq S \leq 11.0$.

The half-value width of a diffraction peak corresponding to the 311 plane of magnetic iron oxide in spinel structure gives a measure of the crystallinity of the magnetic iron oxide. If the half-value width (W) and the BET specific surface area (S) fall within the specific range, the Fe (II) present in the magnetic iron oxide at a specific content shows an excellent effect of relaxing the excessive charge accumulation of the magnetic toner, and the oxidation of the magnetic iron oxide is not readily caused, whereby the charge stabilization of the magnetic toner becomes possible for a long period.

In the present invention, the Fe (II) content in the magnetic iron oxide is 18.5–24.1 wt. %, preferably 20.0–23.8 wt. %.

If the Fe (II) content in the magnetic iron oxide is below 18.5 wt. %, the magnetic toner shows a low charge relaxation effect, particularly under low temperature—low humidity environmental conditions, thus failing to retain a proper charge level and being liable to cause coating failure of the magnetic toner and a decrease in image density. If the Fe (II) content exceeds 24.1 wt. %, the charge of the magnetic toner is somewhat insufficient, thus being liable to cause a low image density in initial images under a high humidity condition.

In the present invention, the half-value width (W) and the BET specific surface area (S) according to nitrogen absorption of the magnetic iron oxide should satisfy the conditions of:

$4.5 \times 10^{-3}S + 0.130 \leq W \leq 4.5 \times 10^{-3}S + 0.160$, and
$4.5 \leq S \leq 11.0$, preferably the following conditions:

$4.5 \times 10^{-3}S + 0.133 \leq W \leq 4.5 \times 10^{-3}S + 0.155$, and
$5.0 \leq S \leq 10.5$.

If the BET specific surface area (S) of the magnetic iron oxide is below 5.0 $m^2/g$, the Fe (II) in the magnetic iron oxide shows little effect of relaxing charge accumulation, thus failing to retain a proper charge level and being liable to cause coating-failure of the magnetic toner and a decrease in image density. If the BET specific surface area (S) exceeds 10.5 $m^2/g$, the magnetic iron oxide is liable to be oxidized so that the stabilization of toner charge for a long period becomes difficult.

If the half-value width (W) of a diffraction peak corresponding to the 311 plane of the magnetic iron oxide in spinel structure is below $4.5 \times 10^{-3}S + 0.133$ in the range of $5.0 \leq S \leq 10.5$, the charge of the magnetic toner becomes insufficient, thus being liable to cause a lowering in density with respect to images at an initial stage under a high humidity condition. If the half-value width exceeds $4.5 \times 10^{-3}S + 0.155$ in the range of $5.0 \leq S \leq 10.5$, the Fe (II) in the magnetic iron oxide shows little effect of charge relaxation, thus failing to retain a proper charge level and being liable to cause coating failure of the magnetic toner and a decrease in image density.

The BET specific surface area (S) according to nitrogen absorption of the magnetic iron oxide used in the present invention corresponds to the BET specific surface area of magnetic iron oxide having a number-average particle size of about 0.10–0.45 μm.

Accordingly, the magnetic iron oxide used in the present invention may also be characterized by a combination of a specific range of the half-value width (W) of a diffraction peak corresponding to the 311 plane of magnetic iron oxide in spinel structure according to X-ray analysis and a specific range of the number-average particle size (D) of the magnetic iron oxide, instead of the above-mentioned relationship of the half-value width (W) and the BET specific surface area (S).

More specifically, in the present invention, the half-value width (W) and the number-average particle size (D) of the magnetic iron oxide should satisfy the conditions of:

$-0.08D + 0.180 \leq W \leq -0.08D + 0.212$, and
$0.10 \leq D \leq 0.45$, preferably the following conditions:

$-0.08D + 0.183 \leq W \leq -0.08D + 0.210$, and
$0.12 \leq D \leq 0.40$,

The magnetic iron oxide may preferably have an apparent bulk density of 0.2–1.0 g/cm$^3$, more preferably 0.3–0.9 g/cm$^3$.

The above-mentioned apparent bulk density range of the magnetic iron oxide is preferred so as to show little agglomeratability and consist principally of particles showing excellent dispersibility in the binder resin.

The magnetic toner according to the present invention may preferably contain 40–120 wt. parts, more preferably 50–110 wt. parts, of the magnetic iron oxide per 100 wt. parts of the binder resin.

The magnetic iron oxide may be prepared, for example, in the following manner.

A ferrous salt solution is neutralized with an equivalent amount or more of an alkali aqueous solution containing a small amount of a metal compound, as desired, to obtain ferrous hydroxide, followed by oxidation with air at 60°–110° C. to form triiron tetroxide, washing with water to remove salts and drying to obtain powdery magnetic iron oxide. In the process of production of the magnetic iron oxide (principally, triiron tetroxide), the average particle size and BET specific surface area of the magnetic iron oxide may be controlled to have specific values in known manners.

For example, the average particle size and BET specific surface area of the magnetic iron oxide may be adjusted by changing the concentration of the ferrous salt solution, the kind and the amount of the alkali, the amount of the metal compound, the temperature of the oxidation, and/or the conditions for bubbling with steam and air.

The above-mentioned drying step is performed in air or an inert gas, such as nitrogen, by using a warm air or gas drier. By controlling the drying step, the Fe (II) content in the magnetic iron oxide may be adjusted. The Fe (II) content in the magnetic iron oxide after the drying step may preferably be at least 10 wt. %. If the Fe (II) content is below 10 wt. %, it is not easy to provide a narrow half-width value (W) of a diffraction pattern corresponding to the 311 plane of magnetite in spinel structure by X-ray diffraction analysis of the magnetic iron oxide, i.e., to improve the crystallinity of the magnetic iron oxide.

The magnetic iron oxide in the state just after the drying step provides a broad diffraction peak corresponding to the 311 plane of magnetite in spinel structure and accordingly a broad half-width value thereof, thus being assumed to show insufficient crystallinity of the magnetic iron oxide. As a result, the magnetic iron oxide in the state after the drying step, even if it has an Fe (II) content of 18.5 wt. % or more, is not only unable to sufficiently exhibit the charge relaxation effect owing to Fe (II) but also susceptible of oxidization, thus being liable to change the chargeability of the resultant magnetic toner with time.

Then, the magnetic iron oxide powder after the drying step is subjected to a heating treatment accompanied with moderate reduction, e.g., at a temperature of 130°–360° C. with a mixture gas containing hydrogen at 50 vol. % or below by dilution with an inert gas, whereby the Fe (II) content and the half-value with of a diffraction pattern corresponding to the 311 plane are adjusted. By the heating treatment, the BET specific surface area of the magnetic iron oxide is somewhat decreased while the number-average particle size thereof is not substantially changed.

If the above heating treatment is conducted at a temperature higher than 360° C. or in an atmosphere containing a higher concentration of hydrogen to cause a rather intense reduction, the magnetic iron oxide is liable to be sintered and the resultant magnetic iron oxide is liable to have a worse dispersibility in the toner binder resin, thus resulting in a lower chargeability.

The magnetic iron oxide subject to such a rather intense reduction tends to show a somewhat narrower half-value width of a diffraction pattern corresponding to the 311 plane but shows an insufficient effect of charge relaxation due to Fe (II). Further, such an intense reduction can result in metallic iron in the magnetic iron oxide, which is susceptible of remarkable oxidation in the atmosphere, thus being undesirable for producing an magnetic iron oxide used in the present invention.

On the other hand, if the heating treatment is performed at a temperature below 130° C., reduction is hardly caused so that the Fe (II) content cannot be readily controlled and the half-width value of a diffraction peak corresponding to the 311 plane cannot be narrowed to such an extent as to provide a magnetic toner with a stable chargeability for a long period.

If the Fe (II) content of the magnetic iron oxide after the drying step is 18.5 wt. % or more, it is possible to adjust the half-value width of a diffraction peak corresponding to the 311 plane by a heating treatment at a temperature of 150°–450° C. in an inert gas atmosphere to provide magnetic iron oxide used in the present invention instead of the above-mentioned heating treatment accompanied with a moderate degree of reduction. Also, in this heating treatment, the BET specific surface area of the magnetic iron oxide is somewhat lowered while the number-average particle size is not substantially changed.

In the magnetic iron oxide used in the present invention, it is possible to incorporate a metal, such as cobalt, nickel, manganese, aluminum or silicon, or a compound of the metal, such as a metal oxide, in the process for production thereof. It is particularly preferred to incorporate metallic silicon or a silicon compound, such as silica, in order to enhance the effect of the present invention.

Various parameters used for characterizing the present invention may be measured by the following methods.

Fe (II) content

The Fe (II) content in a magnetic iron oxide may be measured in the following manner.

0.500 g of a sample magnetic iron oxide is accurately weighed and placed in a 300 ml-conical beaker, and about 30 ml of distilled water and about 20 ml of sulfuric acid (preferably about 36-normal conc. sulfuric acid) were added, followed by sufficient stirring and dissolution under heating on a heater until the mixture becomes clear. Then, 150 ml of distilled water is added thereto, and the resultant sample solution is titrated with 0.1N-KMnO$_4$ until an end point judged by maintenance of pale red color for 30 sec. The Fe (II) content (wt. %) of the magnetic iron oxide is calculated from the following equation based on the volume of the KMnO$_4$ required for the titration:

Fe (II) content (wt. %) = [Titration volume (ml) × 0.005585/0.500 (g)] × 100

Specific surface area

The specific surface area of a magnetic iron oxide may be measured in the following manner.

A flow-type specific surface area-measuring apparatus ("Micromedic Flowsorb Model 2300", available from Shimazu-Micromedic K.K.) may be used, and the specific surface area is measured by the BET one-point method based on the nitrogen gas adsorption capacity. The adsorbed amount may be measured by using a thermal conductivity detector (TCD), and a gaseous mixture of $N_2$ and $H_2$ containing 30 mol. % of $N_2$ is supplied.

A sample magnetic iron oxide is preliminarily dried at 90° C. for 2 hours in a thermostatic drier, and 0.3–0.5 g thereof is taken in a measurement cell, which is held at a prescribed position and subjected to gas-evacuation for 20 min. at 150° C. The cell is secured to a cell holder and subjected to measurement in a prescribed manner to measure the total surface area of the sample. After the measurement, the cell is taken out and the two side pipes thereof are plugged to measure the total weight of the cell, from which the preliminarily measured weights of the blank cell and the two plugs are subtracted to obtain the sample weight. The specific surface area ($m^2/g$) is obtained by dividing the total surface area with the sample weight.

Apparent bulk density

The apparent bulk density of magnetic iron oxide powder may be measured by using "Powder Tester" (trade name, available from Hosokawa Micron K.K.) in the following manner. A 710 $\mu$m-sieve is set and sample magnetic iron oxide powder is charged little by little on the sieve while vibrating the sieve at an amplitude of about 1 mm. The charging of the sample powder and the vibration of the sieve are continued until a 100 cc-accessory cup is heaped up with the sample having passed through the sieve. After the termination, the magnetic iron oxide powder is leveled at the cup brim by an accessory blade, and the magnetic iron oxide powder in the cup is weighed. From the total weight, the blank cup weight is subtracted to obtain the sample weight, from which the apparent bulk density of the sample magnetic iron oxide is calculated based on the following equation:

Apparent bulk density (g/cc)=the sample weight (g)/100 (cc).

Number-average particle size

The number-average particle size and shape of a magnetic iron oxide may be measured or observed as follows. A powdery magnetic iron oxide sample is placed on a copper mesh and fixed by a collodion film to prepare a microscope sample, which is placed on a transmission electron microscope (Model "H-700H", available from Hitachi Seisakusho K.K.) and observed and photographed at a magnification of 10,000 under an acceleration voltage of 100 KV, followed by printing at a magnification of three times to provide a picture at a final magnification of 30,000. From the picture, the shape of the magnetic iron oxide particles is observed, and maximum lengths of the respective particles are measured to provide a number-average particle size as an average thereof.

X-ray diffraction spectrum

The X-ray diffraction spectrum of a magnetic iron oxide may be measured automatically by using a powerful full-automatic X-ray diffraction apparatus ("MXP[18] System", available from Mac Science Co.) and a Cu-K$\alpha$ characteristic X-rays. From an X-ray diffraction chart of the sample magnetic iron oxide, a half-value width is measured in terms of a 2$\theta$-value at a half intensity of a diffraction peak corresponding to the 311 plane of magnetic iron oxide having a spinel structure. The measurement conditions of the X-ray diffraction apparatus may be as follows:

Filter: monochromator
Scanning speed: 0.100 deg./min.
Sampling interval: 0.010 deg.
Target: Cu
Divergence slit: 0.50 deg.
Scattering slit: 0.50 deg.
Receiving slit: 0.30 mm.

The binder resin for use in constituting the magnetic toner according to the present invention, when applied to a hot pressure roller fixing apparatus using an oil applicator for applying an oil to the roller surface, may be a known binder resin for toners. Examples thereof may include: homopolymers of styrene and its derivatives, such as polystyrene, poly-p-chlorostyrene, and polyvinyltoluene; styrene copolymers, such as styrene-p-chlorostyrene copolymer, styrene-vinyltoluene copolymer, styrene-vinylnaphthalene copolymer, styrene-acrylate copolymer, styrene-methacrylate copolymer, styrene-methyl $\alpha$-chloromethacrylate copolymer, styrene-acrylonitrile copolymer, styrene-vinyl methyl ether copolymer, styrene-vinyl ethyl ether copolymer, styrene-vinyl methyl ketone copolymer, styrene-butadiene copolymer, styrene-isoprene copolymer, and styrene-acrylonitrile-indene copolymer; polyvinyl chloride, phenolic resin, natural resin-modified phenolic resin, natural resin-modified maleic acid resin, acrylic resin, methacrylic resin, polyvinyl acetate, silicone resin, polyester resin, polyurethane, polyamide resin, furan resin, epoxy resin, xylene resin, polyvinylbutyral, terpene resin, coumarone-indene resin and petroleum resin.

In a hot pressure roller fixing system using substantially no oil application, it is important to suppress an offset phenomenon that a part of toner image on a toner image-supporting member, such as plain paper, is transferred to the roller, and to ensure an intimate adhesion of a toner on the toner image-supporting member. As a toner fixable with a less heat energy is generally liable to cause blocking or caking in storage or in a developing apparatus, this should be also taken into consideration. With these phenomena, the physical property of a binder resin in a toner is most concerned. According to our study, when the content of a magnetic material in a toner is decreased, the adhesion of the toner onto the toner image-supporting member mentioned above is improved, while the offset is more readily caused and also the blocking or caking are also more liable. Accordingly, when a hot roller fixing system using almost no oil application is adopted in the present invention, selection of a binder resin becomes more serious. A preferred binder resin may for example be a non-crosslinked styrene copolymer having a broad molecular weight distribution, a crosslinked styrene copolymer, or a crosslinked polyester. Examples of comonomers to be used in combination with a styrene monomer to form such a styrene copolymer may include one or more vinyl monomers selected from: monocarboxylic acid having a double bond and their substituted derivatives, such as acrylic acid, methyl acrylate, ethyl acrylate, butyl acrylate, dodecyl acrylate, octyl acrylate, 2-ethylhexyl acrylate, phenyl acrylate, methacrylic acid, methyl methacrylate, ethyl methacrylate, butyl methacrylate, octyl methacrylate, acrylonitrile, methacrylonitrile, and acrylamide; dicarboxylic acids having a double bond and their substituted derivatives, such as maleic acid, butyl maleate, methyl maleate, and dimethyl maleate; vinyl esters, such as vinyl chloride, vinyl acetate, and vinyl benzoate; ethylenic olefins, such as ethylene, propylene, and butylene; vinyl ketones, such as vinyl methyl ketone, and vinyl hexyl ketone; vinyl ethers, such as vinyl methyl ether, vinyl ethyl ether, and vinyl isobutyl ethers.

In the case where the binder resin for constituting the toner of the present invention is a crosslinked resin, a compound having two or more polymerizable double bonds may principally be used as the crosslinking agent. Examples thereof include: aromatic divinyl compounds, such as divinylbenzene, and divinylnaphthalene; carboxylic acid esters having two double bonds, such as ethylene glycol diacrylate, ethylene glycol dimethacrylate, and 1, 3-butanediol diacrylate; divinyl compounds such as divinylaniline, divinyl ether, divinyl sulfide and divinyl sulfone; and compounds having three or more vinyl groups. These compounds may be used singly or in mixture.

For a pressure-fixing system, a known binder resin for pressure-fixable toner may be used. Examples thereof may include: polyethylene, polypropylene, polymethylene, polyurethane elastomer, ethylene-ethyl acrylate copolymer, ethylene-vinyl acetate copolymer, ionomer resin, styrene-butadiene copolymer, styrene-isoprene copolymer, linear saturated polyesters and paraffins.

In the magnetic toner of the present invention, it is preferred that a charge controller may be incorporated in the magnetic toner particles (internal addition), or may be mixed with the toner particles (external addition). By using the charge controller, it is possible to most suitably control the charge amount corresponding to a developing system to be used. Particularly, in the present invention, it is possible to further stabilize the balance between the particle size distribution and the charge.

Examples of the positive charge controller may include: nigrosine and its modification products modified by a fatty acid metal salt, quaternary ammonium salts, such as tributylbenzyl-ammonium-1 hydroxy-4-naphthosulfonic acid salt, and tetrabutylammonium tetrafluoroborate; diorganotin oxides, such as dibutyltin oxide, dioctyltin oxide, and dicyclohexyltin oxide; and diorganotin borates, such as dibutyltin borate, dioctyltin borate, and dicyclo-hexyltin borate. These positive charge controllers may be used singly or as a mixture of two or more species. Among these, a nigrosine-type charge controller or a quaternary ammonium salt charge controller may particularly preferably be used.

As another type of positive charge controller, there may be used a homopolymer of a nitrogen-containing monomer represents by the formula:

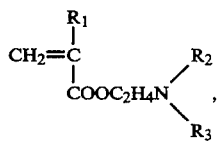

wherein $R_1$ represents H or $CH_3$; and $R_2$ and $R_3$ each represent a substituted or unsubstituted alkyl group (preferably $C_1$–$C_4$); or a copolymer of the nitrogen-containing monomer with another polymerizable monomer such as styrene, acrylates, and methacrylates as described above. In this case, the positive charge controller may also function as the whole or a part of the binder resin.

On the other hand, a negative charge controller can be used in the present invention. Examples thereof may include an organic metal complex or a chelate compound. More specifically there may preferably be used aluminum acethyl-acetonate, iron (II) acetylacetonate, and a 3,5-di-tertiary butylsalicylic acid chromium. There may more preferably be used acetylacetone complexes, or salicylic acid-type metal salts or complexes. Among these, salicylic acid metal complexes (including monoalkyl- and dialkyl-substituted compounds) or salicylic acid metal salts (including monoalkyl- and dialkyl-substituted compounds) may particularly preferably be used.

It is preferred that the above-mentioned charge controller (not functioning as a binder resin) is used in the form of fine powder. In such case, the number-average particle size thereof may preferably be 4 μm or smaller, more preferably 3 μm or smaller.

In the case of internal addition to the magnetic toner, such charge controller may preferably be used in an amount of 0.1–20 wt. parts, more preferably 0.2–10 wt. parts, per 100 wt. parts of the binder resin.

Various additives may be added internally or externally to the magnetic toner according to the present invention. For example, a colorant selected from known dyes and pigments can be added in an amount of 0.5–20 wt. parts per 100 wt. parts of the binder resin. Other additives may include, for example: lubricants, such as zinc stearate; abrasives, such as cerium oxide, silicon carbide and strontium titanate; flowability-improving agents or anti-caking agents, such as colloidal silica, aluminum oxide and titanium oxide; and electro-conductivity-imparting agents, such as carbon black and tin oxide.

In order to improve releasability in hot-roller fixing, it is also a preferred embodiment of the present invention to add to the magnetic toner a waxy material such as low-molecular weight polyethylene, low-molecular weight polypropylene, microcrystalline wax, carnauba wax, sasol wax or paraffin wax preferably in an amount of 0.5–5 wt. % of the binder resin.

The magnetic toner for developing electrostatic images according to the present invention may be produced by sufficiently mixing magnetic iron oxide powder with a binder resin, such as a vinyl-type thermoplastic resin or a polyester resin, like those enumerated hereinbefore, and optionally, a pigment or dye as colorant, a charge controller, another additive, etc., by means of a mixer such as a ball mill, etc.; then melting and kneading the mixture by hot kneading means such as hot rollers, kneader and extruder to disperse or dissolve the magnetic iron oxide powder or the pigment or dye, and optional additives, if any, in the melted resin; cooling and pulverizing the mixture; and subjecting the powder product to precise classification to form the magnetic toner according to the present invention.

Silica fine powder may be internally added to or externally mixed with the magnetic toner according to the present invention, but the external mixing is preferred. In the case where the magnetic toner particles are caused to contact the surface of a cylindrical electroconductive developing sleeve containing a magnetic field-generating means therein in order to triboelectrically charge them, the frequency of the contact between the toner particle surface and the sleeve is increased, whereby the abrasion of the toner particle or the contamination of the sleeve is liable to occur. However, when the magnetic toner of the present invention is combined with the silica fine powder, the silica fine powder is disposed between the toner particles and the sleeve surface, whereby the abrasion of the toner particle is remarkably reduced. Thus, the life of the magnetic toner may be prolonged. As a result, there can be provided a developer comprising a magnetic toner showing excellent characteristics in long-time use.

The silica fine powder may be those produced through the dry process and the wet process. The silica fine powder produced through the dry process is preferred in view of the anti-filming characteristic and durability thereof.

The dry process referred to herein is a process for producing silica fine powder through vapor-phase oxidation of a silicon halide. For example, silica powder can be produced according to the method utilizing pyrolytic oxidation of gaseous silicon tetrachloride in oxygen-hydrogen flame, and the basic reaction scheme may be represented as follows:

$SiCl_4 + 2H_2 + O_2 \rightarrow SiO_2 + 4HCl$.

In the above preparation step, it is also possible to obtain complex fine powder of silica and other metal oxides by using other metal halide compounds such as aluminum chloride or titanium chloride together with silicon halide compounds. Such is also included in the fine silica powder to be used in the present invention.

Commercially available fine silica powder formed by vapor phase oxidation of a silicon halide to be used in the present invention include those sold under the trade names as shown below.

| | |
|---|---|
| AEROSIL | 130 |
| (Nippon Aerosil Co.) | 200 |
| | 300 |
| | 380 |
| | OX 50 |
| | TT 600 |
| | MOX 80 |
| | COK 84 |
| Cab-O-Sil | M-5 |
| (Cabot Co.) | MS-7 |
| | MS-75 |
| | HS-5 |
| | EH-5 |
| Wacker HDK | N 20 |
| (WACKER-CHEMIE GMBH) | V 15 |
| | N 20E |
| | T 30 |
| | T 40 |
| D-C Fine Silica | |
| (Dow Corning Co.) | |
| Fransol | |
| (Fransil Co.) | |

On the other hand, in order to produce silica powder to be used in the present invention through the wet process, various processes known heretofore may be applied. For example, decomposition of sodium silicate with an acid represented by the following scheme may be applied:

$Na_2O.xSiO_2 + HCl + H_2O \rightarrow SiO_2.nH_2O + NaCl$.

In addition, there may also be used a process wherein sodium silicate is decomposed with an ammonium salt or an alkali salt, a process wherein an alkaline earth metal silicate is produced from sodium silicate and decomposed with an acid to form silicic acid, a process wherein a sodium silicate solution is treated with an ion-exchange resin to form silicic acid, and a process wherein natural silicic acid or silicate is utilized.

The silica power to be used herein may be anhydrous silicon dioxide (colloidal silica), and also a silicate such as aluminum silicate, sodium silicate, potassium silicate, magnesium silicate and zinc silicate.

Commercially available fine silica powders formed by the wet process include those sold under the trade names as shown below:

Carplex (available from Shionogi Seiyaku K.K.)
Nipsil (Nippon Silica K.K.)
Tokusil, Finesil (Tokuyama Soda K.K.)
Bitasil (Tagi Seihi K.K.)
Silton, Silnex (Mizusawa Kagaku K.K.)
Starsil (Kamishima Kagaku K.K.)
Himesil (Ehime Yakuhin K.K.)
Siloid (Fuki Devison Kagaku K.K.)
Hi-Sil (Pittsuburgh Plate Glass Co.)
Durosil, Ultrasil (Fulstoff-Gesellshaft Marquart)
Manosil (Hardman and Holden)
Hoesch (Chemische Fabrik Hoesch K-G)
Sil-Stone (Stoner Rubber Co.)
Nalco (Nalco Chem. Co.)
Quso (Philadilphia Quartz Co.)
Imsil (Illinois Minerals Co.)
Calcium Silikat (Chemische Fabrik Hoesch, K-G)
Calsil (Fullstoff-Gesellschaft Marquart)
Fortafil (Imperial Chemical Industries)
Microcal (Joseph Crosfield & Sons. Ltd.)
Manosil (Hardman and Holden)
Vulkasil (Farbenfabriken Bayer, A.G.)
Tufknit (Durham Chemicals, Ltd.)
Silmos (Shiraishi Kogyo K.K.)
Starlex (Kamishima Kagaku K.K.)
Furikosil (Tagi Seihi K.K.)

Among the above-mentioned silica powders, those having a specific surface area as measured by the BET method with nitrogen adsorption of 30 m²/g or more, particularly 50–400 m²/g, provides a good result. In the present invention, the silica fine powder may preferably be used in an amount of 0.01–8 wt. parts, more preferably 0.1–5 wt. parts, with respect to 100 wt. parts of the magnetic toner.

In case where the magnetic toner of the present invention is used as a positively chargeable magnetic toner, it is preferred to use positively chargeable fine silica powder rather than negatively chargeable fine silica powder, in order to prevent the abrasion of the toner particle, and to retain the stability in chargeability.

In order to obtain positively chargeable silica fine powder, the above-mentioned silica powder obtained through the dry or set process may be treated with a silicone oil having an organic groups containing at least one nitrogen atom in its side chain, a nitrogen-containing silane coupling agent, or both of these.

In the present invention, "positively chargeable silica" means one having a positive triboelectric charge with respect to iron powder carrier when measured by the blow-off method.

The silicone oil having a nitrogen atom in its side chain to be used in the treatment of silica fine powder may be a silicone oil having at least the following partial structure:

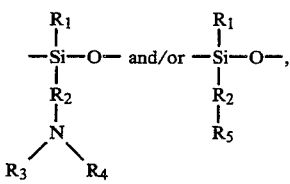

wherein $R_1$ denotes hydrogen, alkyl, aryl or alkoxyl; $R_2$ denotes alkylene or phenylene; $R_3$ and $R_4$ denotes hydrogen, alkyl, or aryl; and $R_5$ denotes a nitrogen-containing heterocyclic group. The above alkyl, aryl, alkylene and phenylene group can contain an organic group having a nitrogen atom, or have a substituent such as halogen within an extent not impairing the chargeability. The above-mentioned silicone oil may preferably be used in an amount of 1–50 wt. %, more preferably 5–30 wt. %, based on the weight of the silica fine powder.

The nitrogen-containing silane coupling agent used in the present invention generally has a structure represented by the following formula:

$$R_m SiY_n,$$

wherein R is an alkoxy group or a halogen atom; Y is an amino group or an organic group having at least one amino group or nitrogen atom; and m and n are positive integers of 1–3 satisfying the relationship of m+n=4.

The organic group having at least one nitrogen group may for example be an amino group having an organic group as a substituent, a nitrogen-containing heterocyclic group, or a group having a nitrogen-containing heterocyclic group. The nitrogen-containing heterocyclic group may be unsaturated or saturated and may respectively be known ones. Examples of the unsaturated heterocyclic ring structure providing the nitrogen-containing heterocyclic group may include the following:

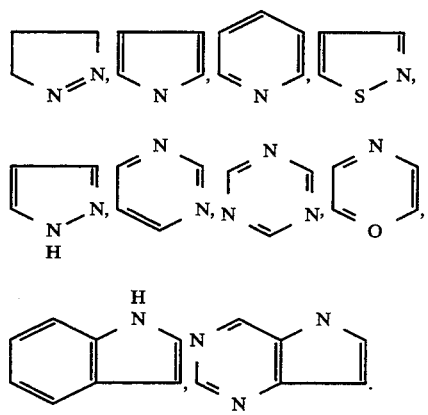

Examples of the saturated heterocyclic ring structure include the following:

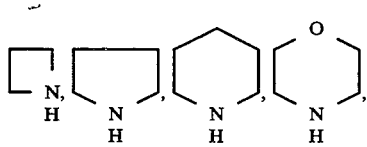

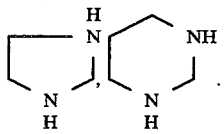

The heterocyclic groups used in the present invention may preferably be those of five-membered or six-membered rings in consideration of stability.

Examples of the silane coupling agent include:
aminopropyltrimethoxysilane,
aminopropyltriethoxysilane,
dimethylaminopropyltrimethoxysilane,
diethylaminopropyltrimethoxysilane,
dipropylaminopropyltrtimethoxysilane,
dibutylaminopropyltrimethoxysilane,
monobutylaminopropyltrimethoxysilane,
dioctylaminopropyltrimethoxysilane,
dibutylaminopropyldimethoxysilane,
dibutylaminopropylmonomethoxysilane,
dimethylaminophenyltriethoxysilane,
trimethoxysilyl-γ-propylphenylamine, and
trimethoxysilyl-γ-propylbenzyl-amine.

Further, examples of the nitrogen-containing heterocyclic compounds represented by the above structural formulas include:
trimethoxysilyl-γ-propylpiperidine,
trimethoxysilyl-γ-propylmorpholine, and
trimethoxysilyl-γ-propylimidazole.

The above-mentioned nitrogen-containing silane coupling agent may preferably be used in an amount of 1–50 wt. %, more preferably 5–30 wt. %, based on the weight of the silica fine powder.

The thus treated positively chargeable silica powder shows an effect when added in an amount of 0.01–8 wt. parts and more preferably may be used in an amount of 0.1–5 wt. parts, respectively with respect to the positively chargeable magnetic toner to show a positive chargeability with excellent stability. As a preferred mode of addition, the treated silica powder in an amount of 0.1–3 wt. parts with respect to 100 wt. parts of the positively chargeable magnetic toner should preferably be in the form of being attached to the surface of the toner particles. The above-mentioned untreated silica fine powder may be used in the same amount as mentioned above.

The silica fine powder used in the present invention may be treated as desired with another silane coupling agent or with an organic silicon compound for the purpose of enhancing hydrophobicity. The silica powder may be treated with such agents in a known manner so that they react with or are physically adsorbed by the silica powder. Examples of such treating agents include hexamethyldisilazane, trimethylsilane, trimethylchlorosilane, trimethylethoxysilane, dimethyldichlorosilane, methyltrichlorosilane, allyldimethylchlorosilane, allylphenyldichlorosilane, benzyldimethylcholrosilane, bromomethyldimethylchlorosilane, α-chloroethyltrichlorosilane, β-chloroethyltrichlorosilane, chloromethyldimethylchlorosilane, triorganosilylmercaptans such as trimethylsilylmercaptan, triorganosilyl acrylates, vinyldimethylacetoxysilane, dimethylethoxysilane, dimethyldimethoxysilane, diphenyldiethoxysilane, hexamethyldisiloxane, 1,3-divinyltetramethyldisiloxane, 1,3-diphenyltetramethyldisiloxane, and dimethylpolysiloxane having 2 to 12 siloxane units per molecule and containing each one hydroxyl group bonded to Si at the terminal units. These may be used alone or as a mixture of two or more compounds. The above-mentioned treating agent may preferably be used in an amount of 1–40 wt. % based on the weight of the silica fine powder.

In the magnetic toner of the present invention, it is preferred to add fine powder of a fluorine-containing polymer such as polytetrafluoroethylene, polyvinylidene fluoride, or tetrafluoroethylene-vinylidene fluoride copolymer. Among these, polyvinylidene fluoride fine powder is particularly preferred in view of fluidity and abrasiveness. Such powder of a fluorine-containing polymer may preferably be added to the magnetic toner in an amount of 0.01–2.0 wt. %, particularly 0.02–1.0 wt. %.

In a magnetic toner wherein the silica fine powder and the above-mentioned fluorine-containing fine powder are combined, while the reason is not necessarily clear, there occurs a phemomenon such that the state of the presence of the silica attached to the toner particle is stabilized and, for example, the attached silica is prevented from separating from the toner particle so that the effect thereof on toner abrasion and the developing sleeve contamination is prevented from decreasing, and the stability in chargeability can further be enhanced.

The magnetic toner according to the present invention may be applicable to various developing methods including the following one as a preferred example.

FIG. 1 is a schematic sectional view for illustrating an embodiment of the developing step to which the magnetic toner according to the present invention is applicable. Referring to the figure, an electrostatic image-bearing member (photosensitive drum) comprising a photosensitive layer 5 on an electroconductive substrate 11 in the direction of an arrow. A developer-carrying member 6 comprising a non-magnetic cylinder (developing sleeve) rotates so as to progress in the same direction as the electrostatic image-bearing member surface at the developing station. Inside the developing sleeve 6, a multi-polar permanent magnet is disposed so as not to rotate. A one-component-type insulating developer 10 comprising a magnetic toner disposed within a developing device 8 is applied onto the surface of the developing sleeve 6, and the magnetic toner particles are provided with a triboelectric charge due to friction between the developing sleeve 6 surface and the magnetic toner particles. Further, a magnetic doctor blade 9 of iron is disposed in the vicinity (spacing of 50–500 μm) of the surface of the developing sleeve 6 and opposite to one magnetic pole of the multi-polar permanent magnet, whereby the magnetic toner layer on the sleeve 6 is regulated uniformly in a small thickness (30–300 μm) to form a developer layer, which is smaller than the gap between the electrostatic image-bearing member and the developing sleeve 6 at the developing station. By regulating the rotation speed of the sleeve 6, the surface velocity and preferably the inner speed of the magnetic toner layer is controlled to be substantially the same as or somewhat higher than the velocity of the electrostatic image-bearing member surface. The magnetic doctor blade 9 can be composed of a permanent magnet so as to form a counter magnetic pole instead of iron. At the developing station, an AC bias or pulse bias may be applied between the developing sleeve 6 and the electrostatic image-bearing member surface by a bias means 14. The AC bias may have a frequency of 200–4000 Hz and a peak-to-peak voltage Vpp of 500–3000 volts.

In the developing step, a non-magnetic cylinder (developing sleeve) 6 containing a multi-polar permanent magnet is used so as to stably retain the magnetic toner on the developing sleeve 6. In order to form a thin and uniform layer of the magnetic toner, a doctor blade 9 of a thin iron plate or a permanent magnet is disposed in the vicinity of the developing sleeve 6 surface. By using such a magnetic doctor blade, a magnetic field is formed between the blade and a magnetic pole of the permanent magnet enclosed within the developing sleeve 6, so that chains of the magnetic toner particles are formed to stand up between the doctor blade 9 and the developing sleeve. This is advantageous in regulating the developer layer in a small thickness at other parts, e.g., a part facing the electrostatic image surface at the developing station. By causing such a forcible movement of the magnetic toner, the magnetic layer is is further uniformized to provide a thin and uniform magnetic toner layer. Further, as the spacing between the doctor blade and the developing sleeve can be set somewhat broader, it is possible to prevent the breakage or agglomeration of the magnetic toner particles. At the developing station, magnetic toner particles are transferred to the electrostatic image side under the action of an electrostatic force and the AC bias or pulse bias. Instead of the doctor blade 9, it is possible to use an elastic blade composed of an elastic or elastomeric material, such as a silicone rubber, so as to regulate the thickness of the magnetic toner layer by a pressing force, thus applying the magnetic toner on the developing sleeve.

In the image-forming apparatus shown in FIG. 1, the photosensitive layer 5 charged by a primary charger 13 is exposed by a prescribed light source to form an electrostatic image thereon. The magnetic toner 10 contained in the developer vessel 8 is stirred by a stirrer and successively supplied to the developing sleeve 6. The electrostatic image on the photosensitive layer 5 is developed by the layer of magnetic toner formed on the developing sleeve to form a magnetic toner image on the photosensitive layer, which is transferred to a transfer-receiving member 19, such as plain paper, by the action of a corona transfer charger 15. The transfer-receiving member 19 carrying the thus-transferred magnetic toner image is separated from the electrostatic image-bearing member by a separating belt 12, passed through a separating roller 21 and conveying rollers 18 and subjected to fixation by a hot-pressure fixing device including a hot roller 16 and a pressure roller 17 to form a fixed magnetic toner image on the transfer-receiving member. The electrostatic image-bearing member carrying the remaining developer after transfer of the magnetic toner image is subjected to removal of the developer by a cleaning brush 20 and then subjected to a subsequent image forming cycle.

The present invention will now be described based on Examples which, however, should not be construed to restrict the scope of the invention.

First, Production Examples and Comparative Production Examples of magnetic toners are described.

PRODUCTION EXAMPLE 1

10 liter of ferrous sulfate aqueous solution containing $Fe^{2+}$ at a concentration of 1.6 mol/liter and 10 liter of 3.4N-NaOH aqueous solution containing 9.5 g of sodium silicate ($SiO_2$: 28.0 wt. %) added thereto were mixed with each other to form a solution, which was then subjected to oxidation at 90° C. while blowing air thereinto.

The resultant black powder was recovered by filtration, washed with water and dried under heating at 110° C. in air at a reduced pressure of 100 mmHg-abs., followed by reduction under heating for 2 hours at 300° C. in a gaseous mixture of hydrogen and nitrogen containing 40 vol. % of hydrogen, to obtain a magnetic iron oxide $A_1$. The above production conditions are summarized in Table 1 appearing hereinafter.

Figure 2:
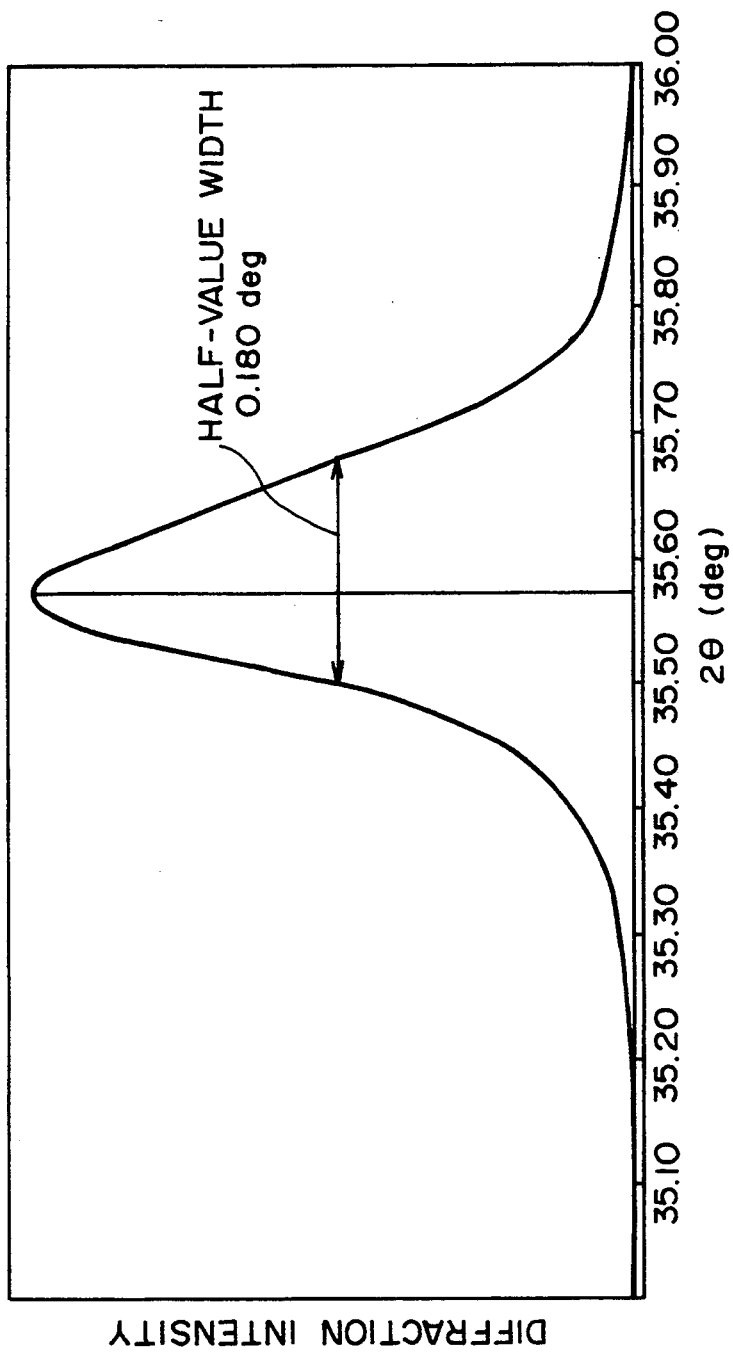
FIG. 2 is a chart showing an X-ray diffraction pattern of magnetic iron oxide of Production Example 1.

The magnetic iron oxide $A_1$ showed an Fe (II) content of 23.1 wt. %, a number-average particle size of 0.185 μm, a BET specific surface area of 7.7 m²/g, and a half-value width of 0.182 deg. of a diffraction peak corresponding to the 311 plane of magnetic iron oxide in spinel structure in its X-ray diffraction pattern as shown in FIG. 2. These properties are summarized in Table 2 also appearing hereinafter.

PRODUCTION EXAMPLE 2

The magnetic iron oxide $A_1$, obtained in Production Example 1 was further subjected to 2 hours of heating at 400° C. in nitrogen gas to obtain a magnetic iron oxide $A_2$ showing the properties given in Table 2.

PRODUCTION EXAMPLE 3

10 liter of ferrous sulfate aqueous solution containing $Fe^{2+}$ at a concentration of 1.2 mol/liter and 10 liter of 2.5N-NaOH aqueous solution containing 16 g of sodium silicate ($SiO_2$: 28.0 wt. %) added thereto were mixed with each other to form a solution, which was then subjected to oxidation at 85° C. while blowing air thereinto.

The resultant black powder was recovered by filtration, washed with water and dried under heating at 75° C. in air at normal pressure, followed by 4 hours of heating at 220° C. in nitrogen gas to obtain a magnetic iron oxide $A_3$ showing the properties given in Table 2.

PRODUCTION EXAMPLE 4

The magnetic iron oxide after the drying step in Production Example 3 was subjected to 4 hours of reduction under heating at 320° C. in a gaseous mixture of hydrogen and nitrogen containing 30 vol. % of hydrogen, thereby to obtain a magnetic iron oxide $A_4$ showing the properties given in Table 2.

PRODUCTION EXAMPLE 5

10 liter of ferrous sulfate aqueous solution containing $Fe^{2+}$ at a concentration of 2.0 mol/liter and 10 liter of 4.4N-NaOH aqueous solution containing 8.0 g of sodium silicate ($SiO_2$: 28 wt. %) were mixed each other to form a solution, which was then subjected to oxidation at 93° C. while blowing air thereinto.

The resultant black powder was recovered by filtration, washed with water and dried under heating at 70° C. in nitrogen gas at normal pressure, followed by 2 hours of reduction under heating at 170° C. in a hydrogen-nitrogen mixture gas containing 20 vol. % of hydrogen to obtain a magnetic iron oxide $A_5$ showing the properties given in Table 2.

PRODUCTION EXAMPLE 6

The magnetic iron oxide after the drying step in Production Example 5 was subjected to 4 hours of reduction under heating at 310° C. in a gaseous mixture of hydrogen and nitrogen containing 40 vol. % of hydrogen, thereby to obtain a magnetic iron oxide $A_6$ showing the properties given in Table 2.

PRODUCTION EXAMPLE 7

Air was blown into 10 liter of ferrous sulfate aqueous solution containing $Fe^{2+}$ at a concentration of 2.4 mol/liter to provide an $Fe^{2+}/Fe^{3+}$ ratio of ½ in the resultant solution. Then, 33 g of sodium silicate ($SiO_2$: 28 wt. %) was dissolved in 26 liter of water for pH adjustment. The solution was then added to the above ferrous sulfate solution.

The resultant solution was neutralized with 6N-NaOH aqueous solution under mechanical stirring to as to provide a remaining NaOh concentration of 2 g/liter, followed by oxidation at 85° C. while blowing air thereinto.

The resultant black powder was recovered by filtration, washed with water and dried under heating at 100° C. in air at normal pressure, followed by reduction under heating in the same manner as in Production Example 1 to obtain a magnetic iron oxide $A_7$ showing the properties given in Table 2.

COMPARATIVE PRODUCTION EXAMPLE 1

Figure 3:
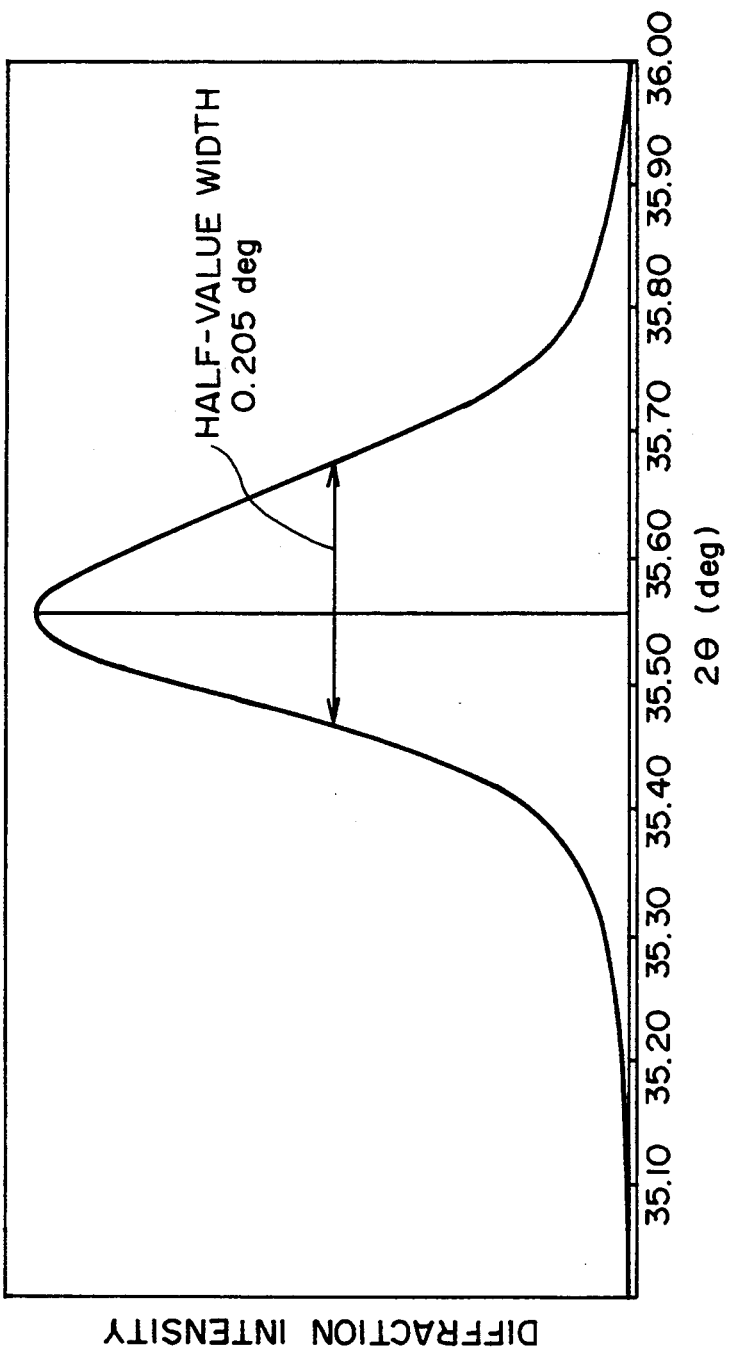
FIG. 3 is a chart showing an X-ray diffraction pattern of magnetic iron oxide of Comparative Production Example 1.

A magnetic iron oxide $B_1$ showing the properties given in Table 2 was prepared in the same manner as in Production Example 1 except for omitting the reduction under heating after the drying. The magnetic iron oxide $B_1$ showed an X-ray diffraction pattern as shown in FIG. 3 giving the half-value width of a diffraction peak corresponding to the 311 plane.

COMPARATIVE PRODUCTION EXAMPLE 2

A magnetic iron oxide $B_2$ showing the properties given in Table 2 was prepared in the same manner as in Production Example 1 except that the reduction under heating after the drying was replaced by 3 hours of heating at 350° C. in nitrogen gas.

COMPARATIVE PRODUCTION EXAMPLE 3

10 liter of ferrous sulfate aqueous solution containing $Fe^{2+}$ at a concentration of 1.0 mol/liter and 10 liter of 2.2N-NaOH aqueous solution containing 20 g of sodium silicate ($SiO_2$: 28 wt. %) were mixed with each other to form a solution, which was then subjected to oxidation at 82° C. while blowing air thereinto.

The resultant black powder was recovered by filtration, washed with water and dried, followed by reduction under heating, all in the same manner as in Production Example 1 to obtain a magnetic iron oxide $B_3$ showing the properties given in Table 2.

COMPARATIVE PRODUCTION EXAMPLE 4

A magnetic iron oxide $B_4$ showing the properties given in Table 2 was prepared in the same manner as in Production Example 3 except that the reduction under heating after the drying was omitted.

COMPARATIVE PRODUCTION EXAMPLE 5

A magnetic iron oxide $B_5$ showing the properties given in Table 2 was prepared in the same manner as in Production Example 5 except that the reduction under heating after the drying was omitted.

COMPARATIVE PRODUCTION EXAMPLE 6

The magnetic iron oxide $A_2$ obtained in Production Example 2 was further subjected to 4 hours of heating at 410° C. in nitrogen gas to obtain a magnetic iron oxide $B_6$ showing the properties given in Table 2.

COMPARATIVE PRODUCTION EXAMPLE 7

A magnetic iron oxide $B_7$ showing the properties given in Table 2 was prepared in the same manner as in Production Example 1 except that the reduction under heating after the drying was performed for 3 hours at 340° C. in a hydrogen-nitrogen mixture gas containing 45 vol. % of hydrogen.

COMPARATIVE PRODUCTION EXAMPLE 8

10 liter of ferrous sulfate aqueous solution containing $Fe^{2+}$ at a concentration of 2.4 mol/liter and 10 liter of 5.2N-NaOH aqueous solution containing 6.0 g of sodium silicate ($SiO_2$: 28 wt. %) were mixed with each other to form a solution, which was then subjected to oxidation at 95° C. while blowing air thereinto.

The resultant black powder was recovered by filtration, washed with water and dried, followed by reduction under heating, in the same manner as in Production Example 1 to obtain a magnetic iron oxide $B_8$ showing the properties given in Table 2.

COMPARATIVE PRODUCTION EXAMPLE 9

A magnetic iron oxide $B_9$ showing the properties given in Table 2 was prepared in the same manner as in Production Example 3 except that the heating after the drying was performed at 420° C. for 1 hour in hydrogen gas.

The magnetic iron oxides prepared in the above-described Production Examples and Comparative Production Examples were observed through an electron microscope, whereby the magnetic iron oxide prepared in Comparative Production Example 9 showed conspicuous agglomeration between particles, the magnetic iron oxide powder prepared in Comparative Production Example 3 showed some degree of agglomeration, but the magnetic iron oxides prepared in the other Production Examples and Comparative Production Examples showed no observable agglomeration between particles.

Figure 4:
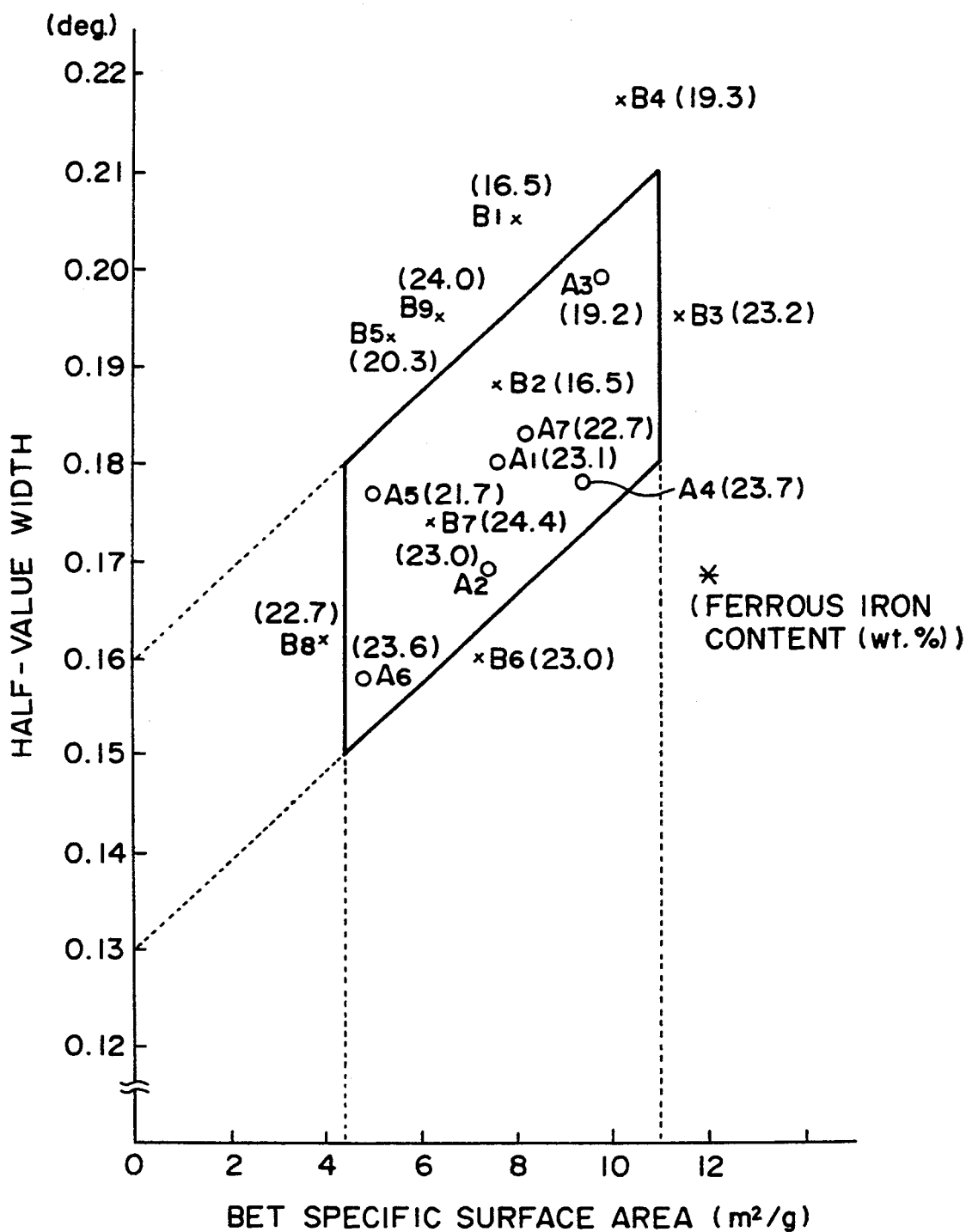
FIG. 4 is a graph showing a relationship between BET specific surface area of magnetic iron oxide and half-value width of X-ray diffraction pattern given by 311 plane of magnetic iron oxide.
Figure 5:
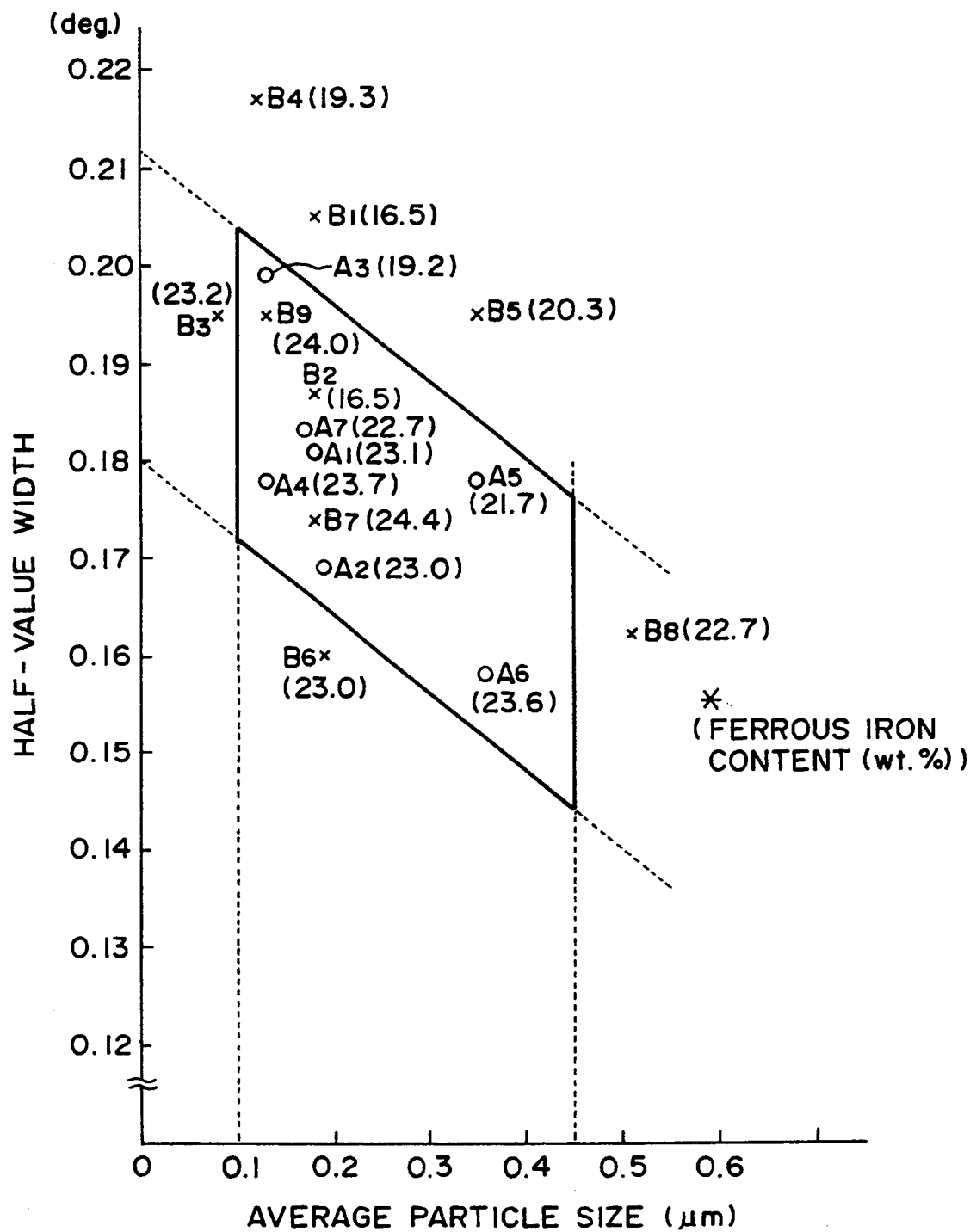
FIG. 5 is a graph showing a relationship between number-average particle size of magnetic iron oxide and half-value width of X-ray diffraction pattern given by 311 plane of magnetic iron oxide.

Table 1 summarizes the conditions of the drying and subsequent steps for production of the magnetic iron oxides prepared in the respective Production Examples and Comparative Production Examples, and Table 2 summarizes the properties of the respective magnetic iron oxides. Further, FIG. 4 plots the half-value width of an X-ray diffraction peak corresponding to the 311 plane versus the BET specific surface area for the respective magnetic iron oxides. FIG. 5 plots the half-value width of an X-ray diffraction peak corresponding to the 311 plane versus the number-average particle size for the respective magnetic iron oxides.

TABLE 1

| | Drying conditions | | | Heating (and reduction) conditions | | | | | | | | |
|---|---|---|---|---|---|---|---|---|---|---|---|---|
| | | | | 1st | | | 2nd | | | 3rd | | |
| Example No.** | Atmosphere | Temp. (°C.) | Press (mmHg) | *$H_2/N_2$ | Temp. (°C.) | Time(h) | *$H_2/N_2$ | Temp. (°C.) | Time(h) | *$H_2/N_2$ | Temp. (°C.) | Time(h) |
| P.E. | | | | | | | | | | | | |
| 1 | Air | 110 | 100 | 40/60 | 300 | 2 | — | — | — | — | — | — |
| 2 | Air | 110 | 100 | 40/60 | 300 | 2 | 0/100 | 400 | 2 | — | — | — |
| 3 | Air | 70 | Normal | 0/100 | 220 | 4 | — | — | — | — | — | — |
| 4 | Air | 70 | Normal | 0/100 | 220 | 4 | 30/70 | 320 | 4 | — | — | — |
| 5 | $N_2$ | 70 | Normal | 20/80 | 170 | 2 | — | — | — | — | — | — |
| 6 | $N_2$ | 70 | Normal | 40/60 | 310 | 4 | — | — | — | — | — | — |
| 7 | Air | 100 | Normal | 40/60 | 300 | 2 | — | — | — | — | — | — |
| C.P.E. | | | | | | | | | | | | |
| 1 | Air | 110 | 100 | — | — | — | — | — | — | — | — | — |
| 2 | Air | 110 | 100 | 0/100 | 350 | 3 | — | — | — | — | — | — |
| 3 | Air | 110 | 100 | 40/60 | 300 | 2 | — | — | — | — | — | — |
| 4 | Air | 70 | Normal | — | — | — | — | — | — | — | — | — |
| 5 | $N_2$ | 70 | Normal | — | — | — | — | — | — | — | — | — |
| 6 | Air | 110 | 100 | 40/60 | 300 | 2 | 0/100 | 400 | 2 | 0/100 | 410 | 4 |
| 7 | Air | 110 | 100 | 45/55 | 340 | 3 | — | — | — | — | — | — |
| 8 | Air | 110 | 100 | 40/60 | 300 | 2 | — | — | — | — | — | — |
| 9 | Air | 70 | Normal | 100/0 | 420 | 1 | — | — | — | — | — | — |

*$H_2/N_2$: The ratio of $H_2/N_2$ is expressed in a volumetric ratio.
**: P.E. stands for Production Example, and C.P.E stands for Comparative Production Example.

TABLE 2

| Example No.** | Designation of magnetic iron oxide | Fe (II) content (wt. %) | BET specific surface area ($m^2/g$) | Average particle size ($\mu$) | Half-value width for (311) plane diffraction peak (deg.) |
|---|---|---|---|---|---|
| P.E. | | | | | |
| 1 | $A_1$ | 23.1 | 7.8 | 0.185 | 0.182 |
| 2 | $A_2$ | 23.0 | 7.5 | 0.185 | 0.169 |
| 3 | $A_3$ | 19.2 | 9.9 | 0.119 | 0.199 |
| 4 | $A_4$ | 23.7 | 9.5 | 0.119 | 0.177 |
| 5 | $A_5$ | 21.7 | 5.1 | 0.355 | 0.178 |
| 6 | $A_6$ | 23.6 | 4.9 | 0.357 | 0.158 |
| 7 | $A_7$ | 22.7 | 8.3 | 0.168 | 0.183 |
| C.P.E. | | | | | |
| 1 | $B_1$ | 16.5 | 7.9 | 0.180 | 0.205 |
| 2 | $B_2$ | 16.5 | 7.4 | 0.182 | 0.187 |
| 33 | $B_3$ | 23.2 | 11.5 | 0.093 | 0.195 |
| 4 | $B_4$ | 19.3 | 10.3 | 0.114 | 0.217 |
| 5 | $B_5$ | 20.3 | 5.4 | 0.352 | 0.193 |
| 6 | $B_6$ | 23.0 | 7.3 | 0.187 | 0.160 |
| 7 | $B_7$ | 24.4 | 6.2 | 0.185 | 0.174 |
| 8 | $B_8$ | 22.7 | 3.9 | 0.508 | 0.162 |

TABLE 2-continued

| Example No.** | Designation of magnetic iron oxide | Fe (II) content (wt. %) | BET specific surface area (m²/g) | Average particle size (μ) | Half-value width for (311) plane diffraction peak (deg.) |
|---|---|---|---|---|---|
| 9 | B₉ | 24.0 | 6.5 | 0.125* | 0.195 |

**: P.E. stands for Production Example, and C.P.E. stands for Comparative Production Example.
*: Agglomerates present

EXAMPLE 1

| | |
|---|---|
| Styrene/butyl acrylate/divinyl benzene copolymer (copolymerization wt. ratio: 80/19.5/0.5, weight-average molecular weight (Mw): 320,000) | 100 wt.parts |
| Magnetic iron oxide A₁ | 80 wt.parts |
| Nigrosine | 2 wt.parts |
| Low-molecular weight polypropylene | 4 wt.parts |

The above ingredients were well blended in a blender and melt-kneaded at 150° C. by means of a twin-screw extruder. The kneaded product was cooled, coarsely crushed by a cutter mill, finely pulverized by means of a pulverizer using jet air stream, and classified by a fixed-wall type wind-force classifier (DS-type Wind-Force Classifier, mfd. by Nippon Pneumatic Mfd. Co. Ltd.) to obtain a classified powder product. Ultra-fine powder and coarse power were simultaneously and precisely removed from the classified powder by means of a multi-division classifier utilizing a Coanda effect (Elbow Jet Classifier available from Nittetsu Kogyo K.K.), thereby to obtain black fine powder (positively chargeable magnetic toner) having a volume-average particle size of 7.8 μm.

To 100 wt. parts of the above-obtained black fine powder, 0.6 wt. part of positively chargeable hydrophobic silica (BET specific surface area: 200 m²/g) and 0.1 wt. part of polyvinylidene fluoride powder were added, and the mixture was blended by a Henschel mixer to obtain a positively chargeable magnetic toner. The thus-obtained magnetic toner was left standing under normal temperature/normal humidity environmental conditions of 23.5° C./60% RH for 10 days, and then charged in a commercially available copying apparatus ("NP-4835" available from Canon K.K.) which comprised an image forming apparatus as shown in FIG. 1 having a so-called FGB developing sleeve (provided with surface concavities in curvature diameters of 10–40 μm formed by blasting spherical glass beads of corresponding diameters) and an OPC (organic photoconductor) photosensitive drum, to be used for developing negatively charged latent images. As a result, images having a high image density of 1.38, free from ground fog and showing a high resolution, were obtained under the normal temperature/normal humidity conditions of 23.5° C./60% RH.

Further, as a result of image formation under low temperature/low humidity conditions of 15° C./10% RH, images having a high image density of 1.37 and free from ground fog were obtained without causing toner coating failure on the sleeve due to charge-up. Further, under high temperature/high humidity conditions of 32.5° C./85% RH, images having a high image density of 1.32 were obtained. Thus, only a small change in image density was observed under varying environmental conditions. Further, as a result of repetitive and continuous copying of 30,000 sheets, the image densities were stable and ground fog or reversal fog was of no problem.

Separately, the magnetic toner was left standing for 2 months under high temperature/high humidity environmental conditions of 35° C./85% RH and then subjected to image formation under various sets of the environmental conditions in the same manner as above. As a result, under each set of the environmental conditions, good images having a high density were obtained with no problem about ground fog or reversal fog. Further, only a small difference in image density was observed owing to the change in environmental conditions. The results are summarized in Table 3 appearing hereinafter.

EXAMPLES 2–7

Magnetic toners were prepared and tested in the same manner as in Example 1 except that the magnetic iron oxides A₂–A₇ were used instead of the magnetic iron oxide A₁. As a result, magnetic toners prepared by using the magnetic iron oxides A₃ and A₅ provided images in continuous image formation of 30,000 sheets, which images showed a somewhat lower image density and were accompanied with slight defects arising from slight coating irregularity on the sleeve but these defects remained at a practically acceptable level. Magnetic toners prepared by using the magnetic iron oxides A₂, A₄, A₆ and A₇ respectively provided good results similarly as in Example 1.

EXAMPLE 8

A negatively chargeable magnetic toner was prepared in the same manner as in Example 1 except for using starting ingredients of 100 wt. parts of polyester resin, 90 wt. parts of the magnetic iron oxide A₁ and 3 wt. parts of dialkylsalicylic acid chromium complex and tested for image formation including development of positively charged latent images by charging the toner in a commercially available copying apparatus ("NP7550" available from Canon K.K.) which comprised an image forming apparatus as shown in FIG. 1 having an amorphous silicon drum, whereby similarly good results as in Example 1 were obtained.

COMPARATIVE EXAMPLE 1

A magnetic toner was prepared and tested for image formation in the same manner as in Example 1 except for using the magnetic iron oxide B₁ instead of the magnetic iron oxide A₁. Under the normal temperature - normal humidity conditions, good results similarly as in Example 1 were obtained except that slight fog was observed in 30,000 sheets of continuous copying. However, under the low temperature - low humidity conditions, ground fog increased and, in 30,000 sheets of continuous copying, the image density lowered and ripple-like thick-pale density irregularity occurred due to coating irregularity of the magnetic toner.

Further, the magnetic toner was left standing for 2 months under the high temperature/high humidity environmental conditions of 35° C./85% RH and then subjected to the same image forming test as above. As a result, under the low temperature/low humidity conditions, a slight degree of density irregularity attributable to toner coating irregularity on the developing sleeve occurred from the initial stage, and the density irregularity was worsened on repetitive copying of 30,000 sheets.

COMPARATIVE EXAMPLE 2

A positively chargeable magnetic toner was prepared and subjected to image formation test in the same manner as in Example 1 except that the magnetic iron oxide $B_2$ was used instead of the magnetic iron oxide $A_1$. As a result, under the low temperature/low humidity conditions, a slight image density lowering and also a slight degree of ripple-like density irregularity occurred due to coating irregularity of the magnetic toner on repetitive copying of 30,000 sheets.

COMPARATIVE EXAMPLES 3–5

Positively chargeable magnetic toners were prepared and tested in the same manner as in Example 1 except that the magnetic iron oxides $B_3$, $B_4$ and $B_5$ were respectively used in place of the magnetic iron oxide $A_1$.

The magnetic iron oxides respectively showed good results similarly as in Example 1 under the normal temperature - normal humidity conditions. Under the low temperature - low humidity conditions, however, a slight image density decrease began to occur and coating irregularity of the magnetic toner on the developing sleeve occurred while it remained at a practically acceptable level. Under the high temperature - high humidity conditions, the magnetic toners provided somewhat low image densities of 1.20 for the magnetic toner of Comparative Example 3, 1.19 for the magnetic toner of Comparative Example 4, and 1.18 for the magnetic toner of Comparative Example 5.

Further, the magnetic toners of Comparative Examples 3–5 were left standing for 2 months under the high temperature - high humidity conditions and then subjected to image forming tests under the respective sets of conditions. As a result, all the magnetic toners caused a slight degree of ground fog under the normal temperature - normal humidity conditions; and caused an increased degree of ground fog and, on repetitive copying of 30,000 sheets, an image density decrease by 0.18–0.21 and ripple-like density irregularity due to coating irregularity of the magnetic toners on the developing sleeve under the low temperature - low humidity conditions. Under the high temperature - high humidity conditions, the magnetic toners provided low image densities of 1.11 for the magnetic toner of Comparative Example 3, 1.09 for the magnetic toner of Comparative Example 4, and 1.10 for the magnetic toner of Comparative Example 5. The results are summarized in Table 3.

COMPARATIVE EXAMPLES 6 AND 7

Positively chargeable magnetic toners were prepared and tested in the same manner as in Example 1 except that the magnetic iron oxides $B_6$ and $B_7$ were respectively used in place of the magnetic iron oxides $A_1$.

The magnetic iron oxides respectively showed good results similarly as in Example 1 under the normal temperature - normal humidity conditions and under the low temperature - low humidity conditions, respectively. Under the high temperature - high humidity conditions, however, the magnetic toners provided low image densities of 1.07 for the magnetic toner of Comparative Example 6, and 1.06 for the magnetic toner of Comparative Example 7.

Further, the magnetic toners of Comparative Examples 6 and 7 were left standing for 2 months under the high temperature - high humidity conditions and then subjected to image forming tests under the respective sets of conditions. As a result, almost the same results as above were obtained.

COMPARATIVE EXAMPLES 8 AND 9

Positively chargeable magnetic toners were prepared and tested in the same manner as in Example 1 except that the magnetic iron oxides $B_8$ and $B_9$ were respectively used in place of the magnetic iron oxides $A_1$.

The magnetic toners respectively caused an image density decrease on repetitive copying of 30,000 sheets and increased ground fog under the normal temperature - normal humidity conditions. Under the low temperature - low humidity conditions, the ground fog became further noticeable and, on repetitive copying of 30,000 sheets, the image density decreased and ripple-like density irregularity occurred due to coating irregularity of the magnetic toner on the developing sleeve.

Further, the respective magnetic toners were left standing for 2 months under the high temperature - high humidity conditions and then subjected to image forming tests under the respective sets of conditions. As a result, the magnetic toner using the magnetic iron oxide $B_8$ showed almost the same tendency as described above, but the magnetic toner using the magnetic iron oxide $B_9$ caused worse ripple-like density irregularity due to coating irregularity of the magnetic toner on the developing sleeve under the low temperature - low humidity conditions.

The above-described results are summarized in the following Table 3.

TABLE 3

| | Leftstanding for 10 days under NT/NH conditions | | | | | | | | Leftstanding for two months under HT/HH conditions | | | | | | | |
|---|---|---|---|---|---|---|---|---|---|---|---|---|---|---|---|---|
| | | | | | | | Coating irregularity* | | | | | | | | Coating irregularity* | |
| | Image density | | | | | | Initial | After 30000 | Image density | | | | | | Initial | After 3000 |
| | Initial stage | | | After 30000 sheets | | | stage | sheets | Initial stage | | | After 30000 sheets | | | stage | sheets |
| Toner history | NT/NH | HT/HH | LT/LH | NT/NH | HT/HH | LT/LH | LT/LH | LT/LH | NT/NH | HT/HH | LT/LH | NT/NH | HT/HH | LT/LH | LT/LH | LT/LH |
| Ex. | | | | | | | | | | | | | | | | |
| 1 | 1.38 | 1.32 | 1.37 | 1.37 | 1.30 | 1.35 | ○ | ○ | 1.35 | 1.28 | 1.36 | 1.37 | 1.27 | 1.33 | ○ | ○ |
| 2 | 1.36 | 1.28 | 1.38 | 1.37 | 1.30 | 1.36 | ○ | ○ | 1.33 | 1.26 | 1.37 | 1.36 | 1.29 | 1.35 | ○ | ○ |
| 3 | 1.34 | 1.25 | 1.36 | 1.36 | 1.24 | 1.28 | ○ | ○Δ | 1.30 | 1.21 | 1.36 | 1.35 | 1.25 | 1.25 | ○ | ○Δ |
| 4 | 1.37 | 1.26 | 1.38 | 1.38 | 1.29 | 1.36 | ○ | ○ | 1.36 | 1.24 | 1.38 | 1.38 | 1.27 | 1.36 | ○ | ○ |
| 5 | 1.39 | 1.31 | 1.38 | 1.37 | 1.29 | 1.29 | ○ | ○Δ | 1.33 | 1.20 | 1.35 | 1.34 | 1.23 | 1.26 | ○ | ○Δ |
| 6 | 1.35 | 1.24 | 1.37 | 1.37 | 1.28 | 1.37 | ○ | ○ | 1.31 | 1.22 | 1.34 | 1.36 | 1.27 | 1.33 | ○ | ○ |

TABLE 3-continued

| | Leftstanding for 10 days under NT/NH conditions | | | | | | Coating irregularity* | | Leftstanding for two months under HT/HH conditions | | | | | | Coating irregularity* | |
|---|---|---|---|---|---|---|---|---|---|---|---|---|---|---|---|---|
| | Image density | | | | | | Initial stage | After 30000 sheets | Image density | | | | | | Initial stage | After 3000 sheets |
| | Initial stage | | | After 30000 sheets | | | | | Initial stage | | | After 30000 sheets | | | | |
| Toner history | NT/NH | HT/HH | LT/LH | NT/NH | HT/HH | LT/LH | LT/LH | LT/LH | NT/NH | HT/HH | LT/LH | NT/NH | HT/HH | LT/LH | LT/LH | LT/LH |
| 7 | 1.39 | 1.33 | 1.38 | 1.38 | 1.31 | 1.35 | ○ | ○ | 1.36 | 1.29 | 1.35 | 1.38 | 1.30 | 1.31 | ○ | ○ |
| Comp. Ex. | | | | | | | | | | | | | | | | |
| 1 | 1.37 | 1.31 | 1.31 | 1.34 | 1.27 | 1.15 | ○Δ | x | 1.32 | 1.22 | 1.22 | 1.30 | 1.26 | 1.13 | Δ | x |
| 2 | 1.38 | 1.29 | 1.37 | 1.36 | 1.30 | 1.21 | ○ | Δ | 1.30 | 1.23 | 1.34 | 1.34 | 1.26 | 1.19 | ○ | Δ |
| 3 | 1.30 | 1.20 | 1.36 | 1.34 | 1.19 | 1.28 | ○ | ○Δ | 1.28 | 1.11 | 1.35 | 1.34 | 1.20 | 1.15 | ○Δ | x |
| 4 | 1.32 | 1.19 | 1.37 | 1.35 | 1.20 | 1.26 | ○ | ○Δ | 1.29 | 1.09 | 1.32 | 1.33 | 1.17 | 1.14 | ○Δ | x |
| 5 | 1.35 | 1.18 | 1.36 | 1.35 | 1.21 | 1.27 | ○ | ○Δ | 1.32 | 1.10 | 1.36 | 1.35 | 1.19 | 1.15 | ○Δ | x |
| 6 | 1.30 | 1.07 | 1.33 | 1.34 | 1.21 | 1.36 | ○ | ○ | 1.29 | 1.04 | 1.30 | 1.35 | 1.20 | 1.37 | ○ | ○ |
| 7 | 1.28 | 1.06 | 1.30 | 1.35 | 1.20 | 1.34 | ○ | ○ | 1.27 | 1.03 | 1.29 | 1.34 | 1.18 | 1.35 | ○ | ○ |
| 8 | 1.30 | 1.23 | 1.35 | 1.20 | 1.09 | 1.23 | ○Δ | Δ | 1.28 | 1.20 | 1.33 | 1.20 | 1.08 | 1.19 | ○Δ | Δ |
| 9 | 1.38 | 1.18 | 1.37 | 1.25 | 1.07 | 1.24 | ○Δ | Δ | 1.30 | 1.02 | 1.34 | 1.24 | 1.05 | 1.08 | Δ | x |

Notes to Table 3
In the above table, the following abbreviations are used for showing the environmental conditions:
NT/NH: Normal temperature/normal humidity conditions of 23.5° C./60% RH.
HT/HH: High temperature/high humidity conditions of 32.5° C./85% RH.
LT/LH: Low temperature/low humidity conditions of 15° C./10% RH.
*The coating irregularity was evaluated according to the following standards:
○: Utterly no.
○Δ: Slight (no problem with images)
Δ: Somewhat much (slight density irregularity on images)
x: Very much (noticeable density irregularity on images)

As described above, the magnetic iron oxide used in the present invention has a specific Fe (II) content and a specific relationship between the half-value width W (deg.) of a diffraction peak corresponding to the 311 plane of magnetite in spinel structure and the BET specific surface area S (m²/g) of the magnetic iron oxide, or has been obtained through heating under specific conditions, has a specific Fe (II) content and a specific relationship between the half-value width W (deg.) of a diffraction peak corresponding to the 311 plane of magnetite in spinel structure and the number-average particle size D (μm) of the magnetic iron oxide. As a result, the magnetic iron oxide shows an excellent crystallinity, so that the magnetic toner according to the present invention containing the magnetic iron oxide causes little charge-up, shows little change in performance with time, and provide good images having a high image density for a long period of time. Further, the magnetic toner provides good images for a long period of time under various environmental conditions with a suppressed change in image density even if subjected to changes in environmental conditions, such as temperature and/or humidity.

What is claimed is:

1. A magnetic toner, comprising: at least a binder resin and a magnetic iron oxide; wherein said magnetic iron oxide has an Fe(II) content of 18.5–24.1 wt. %, and shows a BET specific surface area of S (m²/g) and an X-ray diffraction pattern giving a half-value width W (deg.) of a diffraction peak corresponding to 311 plane of the magnetic iron oxide in spinel structure, the values S and W satisfying:

$$4.5 \times 10^{-3}S + 0.130 \leq W \leq 4.5 \times 10^{-3}S + 0.160, \text{ and}$$
$$4.5 \leq S \leq 11.0.$$

2. The magnetic toner according to claim 1, wherein the magnetic iron oxide has an Fe (II) content of 20.0–23.8 wt. %.

3. The magnetic toner according to claim 1, wherein the values S and W of the magnetic iron oxide satisfy:

$$4.5 \times 10^{-3}S + 0.133 \leq W \leq 4.5 \times 10^{-3}S + 0.155, \text{ and}$$
$$5.0 \leq S \leq 10.5.$$

4. The magnetic toner according to claim 1, wherein the magnetic iron oxide has an apparent bulk density of 0.2–1.0 g/cm³.

5. The magnetic toner according to claim 1, wherein the magnetic iron oxide has an apparent bulk density of 0.3–0.9 g/cm³.

6. The magnetic toner according to claim 1, wherein the magnetic iron oxide is contained in an amount of 40–120 wt. parts per 100 wt. parts of the binder resin.

7. The magnetic toner according to claim 1, wherein the magnetic iron oxide is contained in an amount of 50–110 wt. parts per 100 wt. parts of the binder resin.

8. The magnetic toner according to claim 1, wherein the magnetic iron oxide has been prepared through a process wherein a ferrous salt solution is neutralized with an equivalent amount or more of an alkali aqueous solution to obtain ferrous hydroxide, followed by oxidation with air to form magnetic iron oxide particles, washing with water and drying to obtain powdery magnetic iron oxide, and the magnetic iron oxide powder is then subjected to a heating treatment accompanied with moderate reduction at a temperature of 130°–360° C. with a mixture gas containing hydrogen at 50 vol. % or below by dilution with an inert gas.

9. The magnetic toner according to claim 1, wherein the magnetic iron oxide has been prepared through a process wherein a ferrous salt solution is neutralized with an equivalent amount or more of an alkali aqueous solution to obtain ferrous hydroxide, followed by oxidation with air to form magnetic iron oxide particles, washing with water and drying to obtain powdery magnetic iron oxide, and the magnetic iron oxide powder is then subjected to a heating treatment at a temperature of 150°–450° C. in an inert gas.

10. The magnetic toner according to claim 1, wherein the magnetic iron oxide has an average particle size of about 0.10–0.45 μm.

11. A magnetic toner, comprising: at least a binder resin and a magnetic iron oxide; wherein said magnetic iron oxide has been obtained through a heating treatment at a temperature of 130°–360° C. within a gaseous mixture of hydrogen and nitrogen containing 50 vol. % or less of hydrogen or at a temperature of 150°–450° C. in an inert gas, and said magnetic iron oxide has an Fe(II) content of 18.5–24.1 wt. %, and shows a number-average particle size of D (μm) and an X-ray diffraction pattern giving a half-value width W (deg.) of a diffraction peak corresponding to 311 plane of the magnetic iron oxide in spinel structure, the values D and W satisfying:

$-0.08D + 0.180 \leq W \leq -0.08D + 0.212$, and $0.10 \leq D \leq 0.45$.

12. The magnetic toner according to claim 11, wherein the magnetic iron oxide has an Fe (II) content of 20.0–23.8 wt. %.

13. The magnetic toner according to claim 11, wherein the values D and W of the magnetic iron oxide satisfy:

$-0.08D + 0.183 \leq W \leq -0.08D + 0.210$, and $0.12 \leq D \leq 0.40$.

14. The magnetic toner according to claim 11, wherein the magnetic iron oxide has an apparent bulk density of 0.2–1.0 g/cm$^3$.

15. The magnetic toner according to claim 11, wherein the magnetic iron oxide has an apparent bulk density of 0.3–0.9 g/cm$^3$.

16. The magnetic toner according to claim 11, wherein the magnetic iron oxide is contained in an amount of 40–120 wt. parts per 100 wt. parts of the binder resin.

17. The magnetic toner according to claim 11, wherein the magnetic iron oxide is contained in an amount of 50–110 wt. parts per 100 wt. parts of the binder resin.

18. The magnetic toner according to claim 11, wherein the magnetic iron oxide has been prepared through a process wherein a ferrous salt solution is neutralized with an equivalent amount or more of an alkali aqueous solution to obtain ferrous hydroxide, followed by oxidation with air to form magnetic iron oxide particles, washing with water and drying to obtain powdery magnetic iron oxide, and the magnetic iron oxide powder is then subjected to a heating treatment accompanied with moderate reduction at a temperature of 130°–360° C. with a mixture gas containing hydrogen at 50 vol. % or below by dilution with an inert gas.

19. The magnetic toner according to claim 11, wherein the magnetic iron oxide has been prepared through a process wherein a ferrous salt solution is neutralized with an equivalent amount or more of an alkali aqueous solution to obtain ferrous hydroxide, followed by oxidation with air to form magnetic iron oxide particles, washing with water and drying to obtain powdery magnetic iron oxide, and the magnetic iron oxide powder is then subjected to a heating treatment at a temperature of 150°–450° C. in an inert gas.

20. The magnetic toner according to claim 11, wherein the magnetic iron oxide has a BET specific surface area of 4.5–11.0 m$^2$/g.

* * * * *

UNITED STATES PATENT AND TRADEMARK OFFICE
CERTIFICATE OF CORRECTION

PATENT NO. : 5,354,637
DATED : October 11, 1994
INVENTOR(S) : MASAYOSHI SHIMAMURA, ET AL.

Page 1 of 3

It is certified that error appears in the above-identified patent and that said Letters Patent is hereby corrected as shown below:

ON TITLE PAGE

"58-18656  2/1980  Japan" should read
--55-18656  2/1980  Japan--.
In [56] References Cited, under OTHER PUBLICATIONS:
"P.G. 146 Mar. 18, 1983)." should read
--pg. 146, Mar. 18, 1983.--.
Under *Attorney, Agent, or Firm*, "Harper, FitzPatrick, Cella & Scinto" should read --Fitzpatrick, Cella, Harper, & Scinto--.

COLUMN 2

Line 10, "vicinity" should read --proximity--.
Line 49, "ununiform" should read --nonuniform--.
Line 66, "an" should read --a--.
Line 67, "un-uniformity" should read --nonuniformity--.

COLUMN 3

Line 3, "Un-uniformity" should read --Nonuniformity--.
Line 20, "unstability" should read --instability--.
Line 37, "a" should be deleted.
Line 55, "a" should be deleted.

COLUMN 4

Line 16, "a" should be deleted and "in respect of" should read --with respect to--.
Line 20, "generic" should read --general--.

UNITED STATES PATENT AND TRADEMARK OFFICE
CERTIFICATE OF CORRECTION

PATENT NO. : 5,354,637
DATED : October 11, 1994
INVENTOR(S) : MASAYOSHI SHIMAMURA, ET AL.

Page 2 of 3

It is certified that error appears in the above-identified patent and that said Letters Patent is hereby corrected as shown below:

COLUMN 9

Line 23, "weight. Apparent" should read
--weight. ¶ Apparent--.
Line 65, "a" should be deleted.

COLUMN 10

Line 42, "a" should be deleted.

COLUMN 11

Line 54, "represents" should read --represented--.

COLUMN 12

Line 7, "acethyl-acetonate," should read
--acetyl-acetonate,--.

COLUMN 14

Line 17, "(Pittsuburgh" should read --(Pittsburgh--.
Line 18, "(Fulstoff-Gesellshaft" should read
--(Fullstoff-Gesellschaft--.
Line 24, "(Philadilphia" should read --(Philadelphia--.

COLUMN 15

Line 11, "denotes" should read --denote--. (second occurrence)

COLUMN 20

Line 12, "NaOh" should read --NaOH--.

UNITED STATES PATENT AND TRADEMARK OFFICE
CERTIFICATE OF CORRECTION

PATENT NO. : 5,354,637
DATED : October 11, 1994
INVENTOR(S) : MASAYOSHI SHIMAMURA, ET AL.

It is certified that error appears in the above-identified patent and that said Letters Patent is hereby corrected as shown below:

<u>COLUMN 22</u>

TABLE 2, "7.8" should read --7.7-- and
          "33" should read --3--.

<u>COLUMN 26</u>

TABLE 3, "Leftstanding" (both occurrences) should read
          --Left standing--.

<u>COLUMN 27</u>

TABLE 3-continued, "Leftstanding" (both occurrences) should
          read --Left standing--.
    Line 44, "provide" should read --provides--.

Signed and Sealed this

Second Day of May, 1995

Attest:

BRUCE LEHMAN

*Attesting Officer*       *Commissioner of Patents and Trademarks*